March 29, 1966 J. N. FLANNERY ET AL 3,242,568
MACHINE TOOL WITH A TRAVELING TOOL CHANGER
Filed Feb. 12, 1964 10 Sheets-Sheet 7

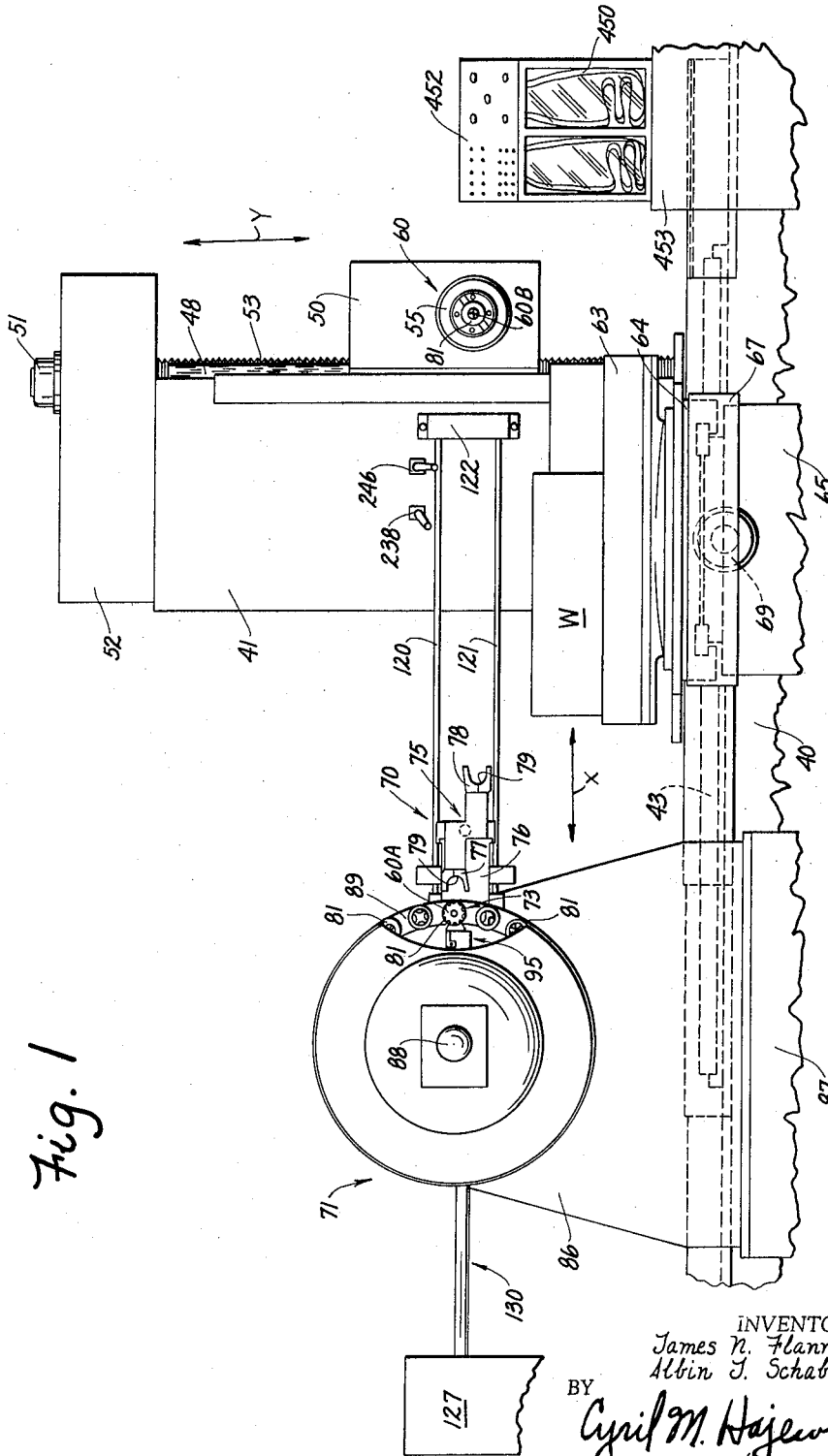

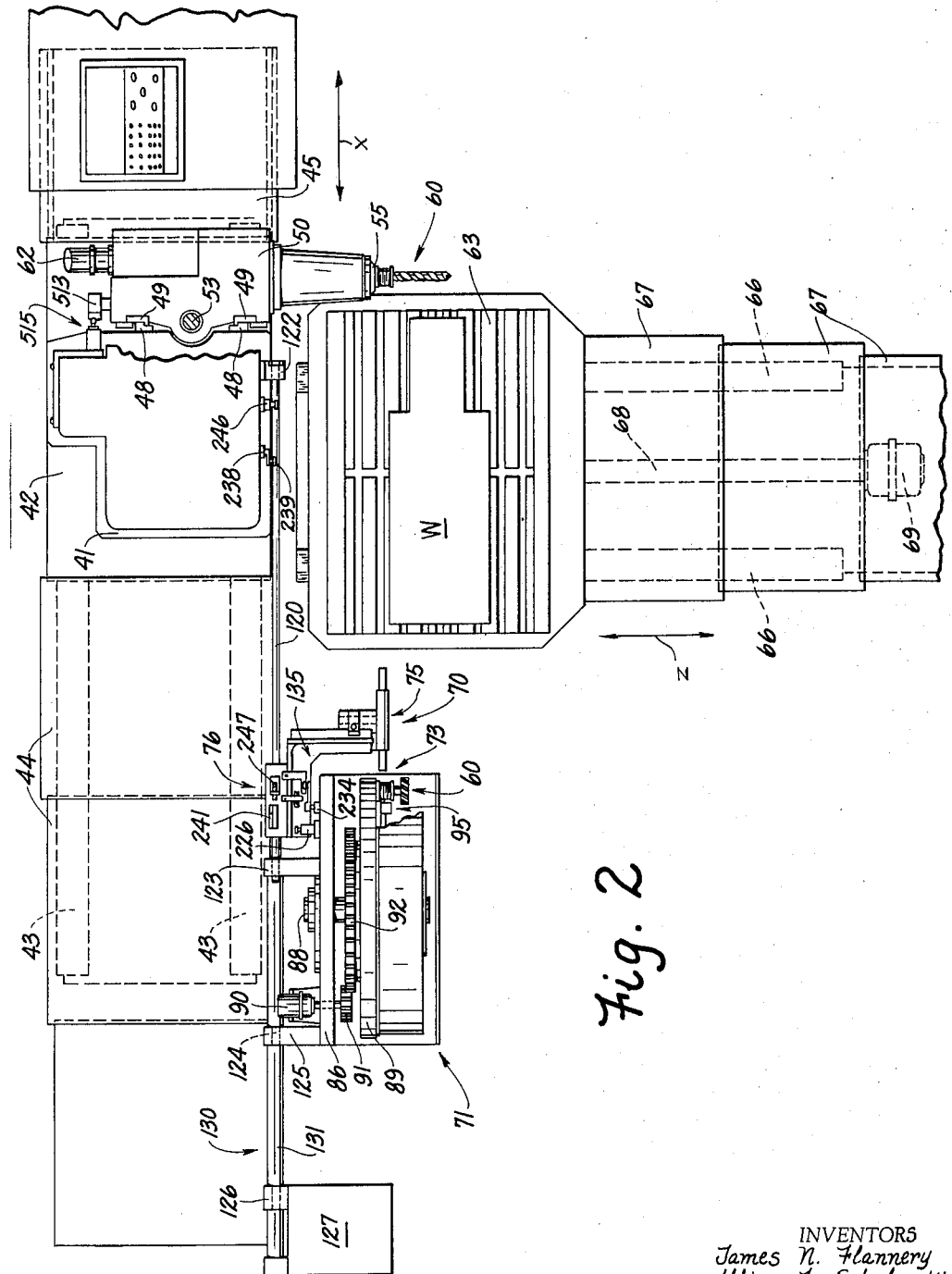

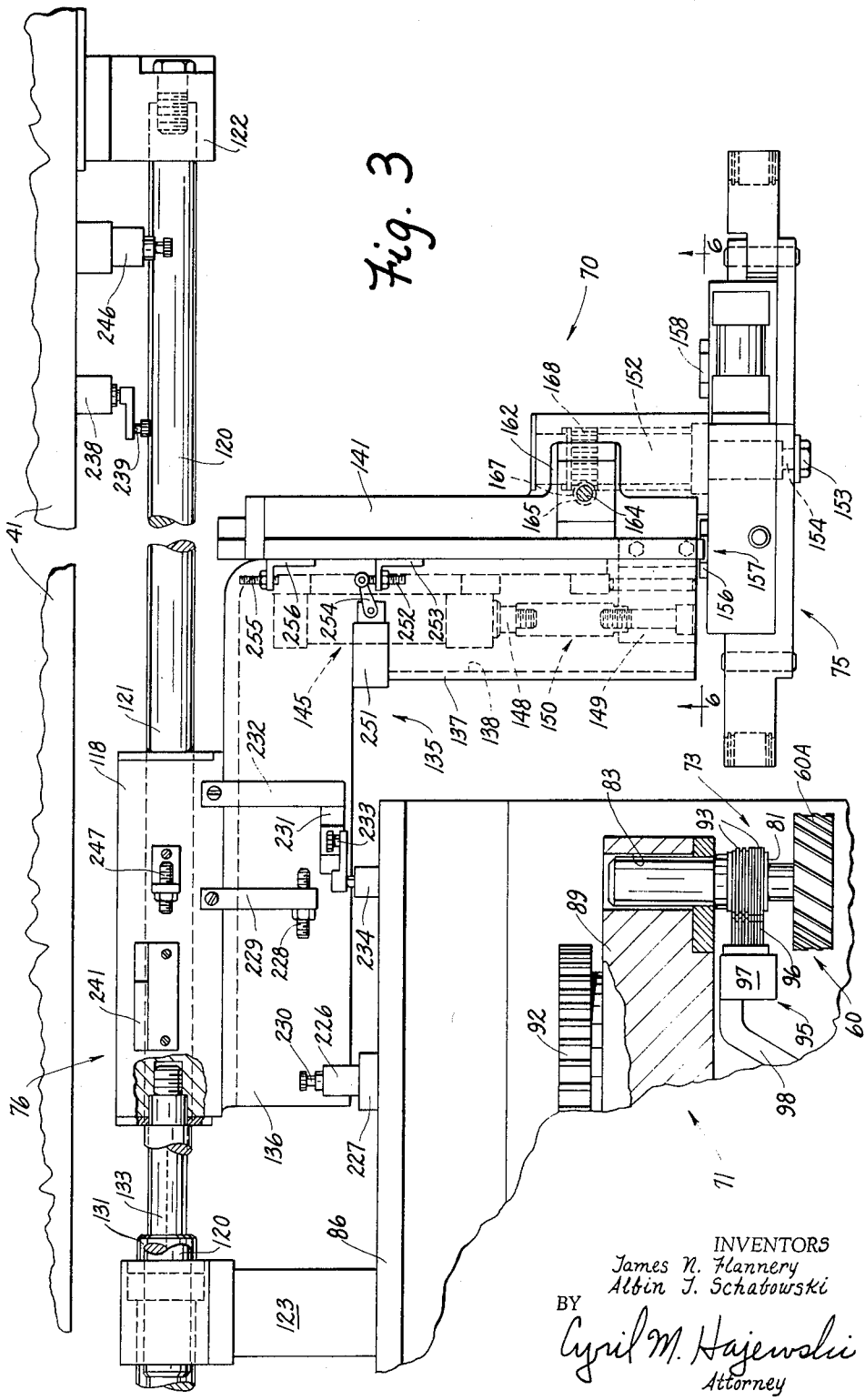

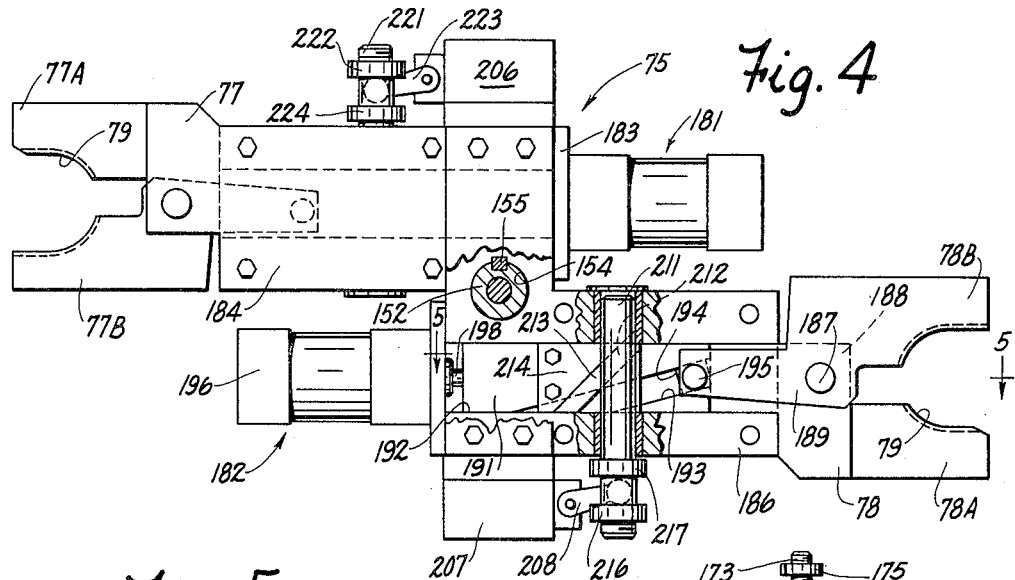

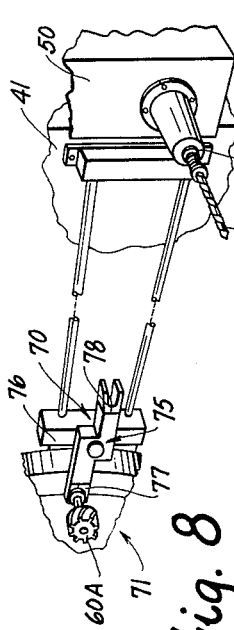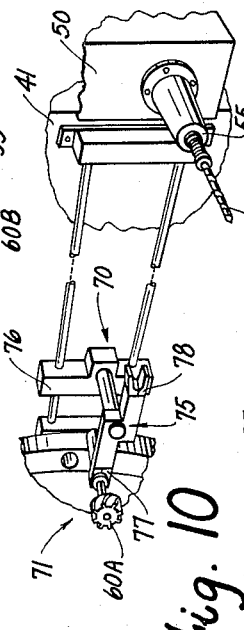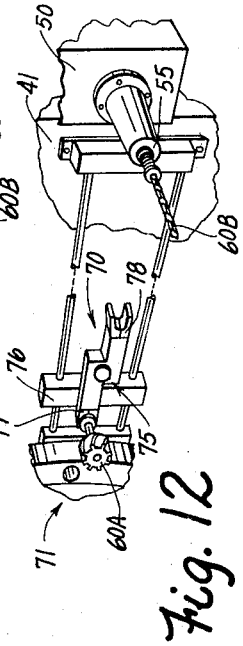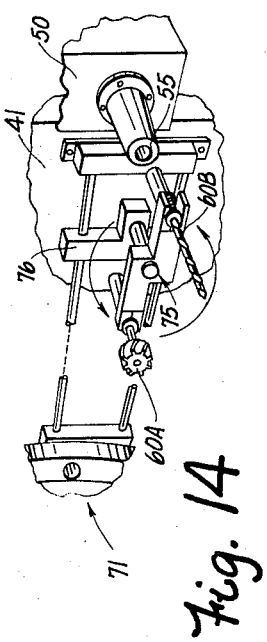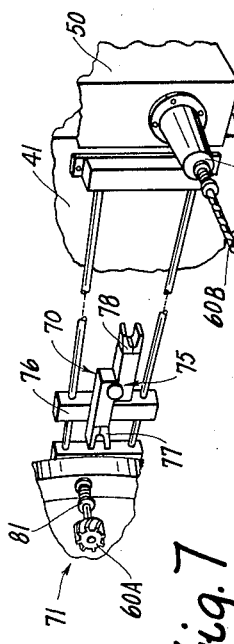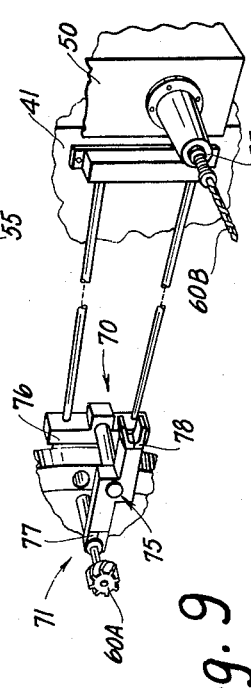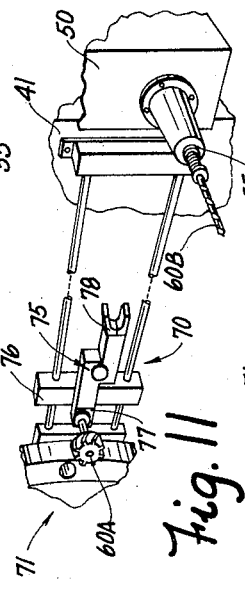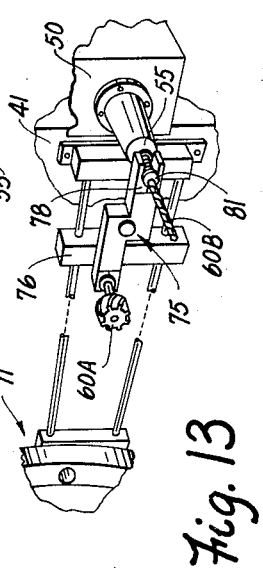

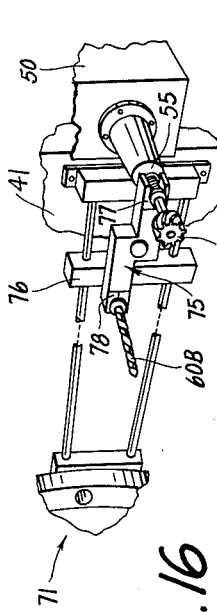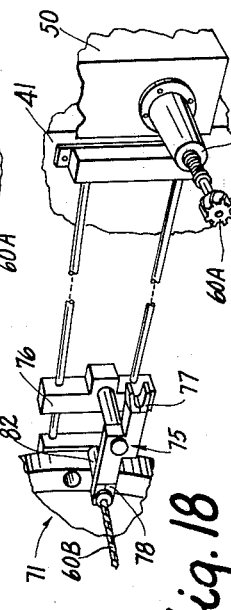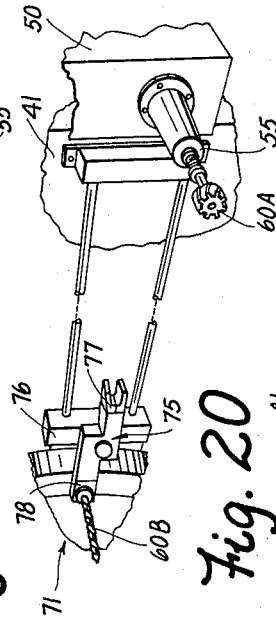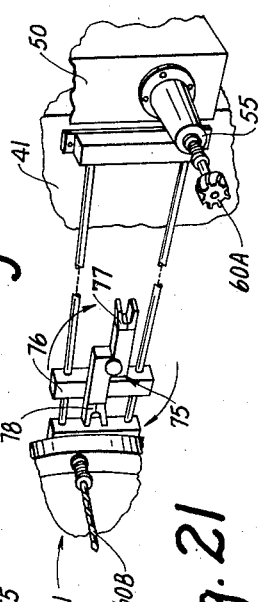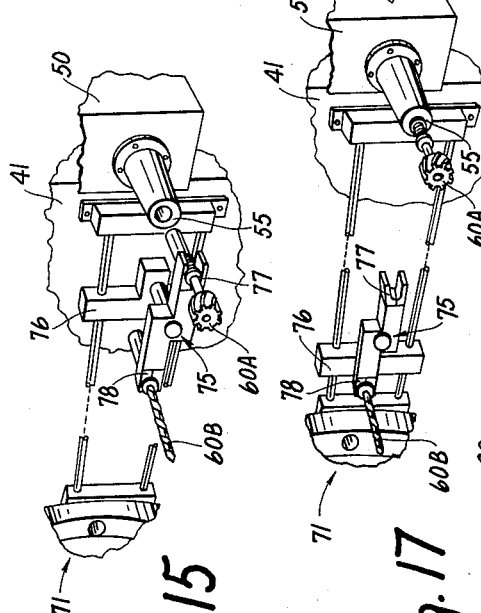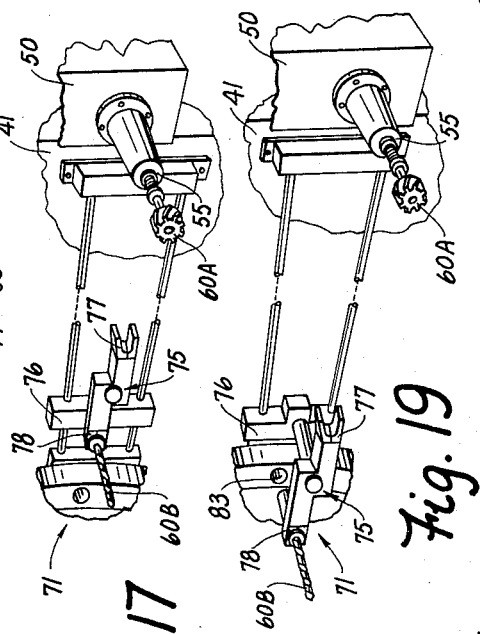

INVENTORS
James N. Flannery
Albin J. Schabowski
BY
Cyril M. Hajewski
Attorney

United States Patent Office 3,242,568
Patented Mar. 29, 1966

1

3,242,568
MACHINE TOOL WITH A TRAVELING
TOOL CHANGER
James N. Flannery, West Allis, and Albin J. Schabowski, Milwaukee, Wis., assignors to Kearney & Trecker Corporation, West Allis, Wis., a corporation of Wisconsin
Filed Feb. 12, 1964, Ser. No. 344,296
12 Claims. (Cl. 29—568)

The present invention relates generally to machine tools and more particularly to an improved machine tool with a tool change mechanism that facilitates the interchange of tools in the machine spindle.

It is a general object of the present invention to provide a machine tool with a tool changer of improved versatility.

Another object of the present invention is to provide an improved machine tool with a tool changer that minimizes the time for changing tools in the operating spindle of the machine.

Another object of the present invention is to provide a mechanism that will function to replace a tool in the spindle with a tool from a tool storage magazine although the location of the spindle may vary from one tool change operation to another.

Another object of the present invention is to provide a mechanism that will function to replace a tool in the spindle with a tool from a tool storage magazine without the necessity of moving the spindle to a single specific location for the performance of the tool change operation.

A further object of the present invention is to provide an improved machine tool with a tool change mechanism that is operable to remove a selected tool from an associated storage magazine and hold the selected tool in readiness for placement in the operating spindle of the machine, while the spindle is performing a work operation with a different tool.

Yet another object of the present invention is to provide an improved machine tool with a tool change mechanism in which movement of the spindle supporting column to a predetermined position is not required for effecting a tool change, thereby minimizing the wear on the column drive mechanism and the column supporting guideways.

According to this invention, an improved machine tool is provided with a rotary spindle and a plurality of cutting tools adapted to be received by the spindle for performing a work operation. The cutting tools are stored in a rotatable storage magazine so that they may be moved in a circular path to locate a desired cutting tool at a ready station where it is available to a tool change mechanism for subsequent transfer to the machine operating spindle. The tool change mechanism is supported for translational movement between the storage magazine and the rotary spindle of the machine regardless of the lateral position of the spindle relative to the storage magazine. The tool changer supporting guideway is adapted to move with the spindle supporting column in either direction thereby providing a continuous guideway for the tool changer irrespective of the variable spacing which may exist between the ready station of the magazine and the spindle. As a result, the tool changer may be operated to remove a selected desired tool located at the ready station from the magazine and hold this selected tool in readiness at a parked position, while the spindle is being operated to perform a machining operation. As soon as the machining operation is completed, the spindle is positioned into a predetermined vertical position, but the supporting column need not be moved from the last machining position. With the spindle located in the predetermined vertical plane, the tool changer with the next tool carried by it is moved along the movable supporting guideway into engagement with the previously used tool presented by the spindle. The tool changer is then operated to remove the previously used tool from the spindle and place the next desired tool into operative position in the spindle. The tool changer is then operated to return the old tool into storage position in the magazine.

The foregoing and other objects of this invention, which will become more fully apparent from the following detailed description, may be achieved by means of the exemplifying apparatus depicted in and set forth in this specification in connection with the accompanying drawings, in which:

FIGURE 1 is a view in front elevation of a machine tool incorporating the features of the present invention;

FIG. 2 is a plan view of the machine depicted in FIG. 1 with part of the column cap broken away to show the operating mechanism of the machine;

FIG. 3 is an enlarged fragmentary view partly in plan and partly in horizontal section showing the tool change carrier and support therefor, as well as the tool change arm, and also showing a portion of the tool storage magazine and a storage socket thereof with the reading head in tool sensing position;

FIG. 4 is an enlarged view in front elevation of the tool change arm with parts broken away to show the internal mechanism for operating the rightward extending tool grip;

FIG. 5 is an enlarged fragmentary view in horizontal section taken through one tool grip housing along the plan represented by the line 5—5 in FIG. 4;

FIG. 6 is an enlarged detail view partly in elevation and partly in vertical section of the carrier and tool change arm slide taken along a plane represented by the line 6—6 in FIG. 5, with parts broken away to show the internal drive mechanism for effecting the pivotal movement of the tool change arm;

Figure 22:
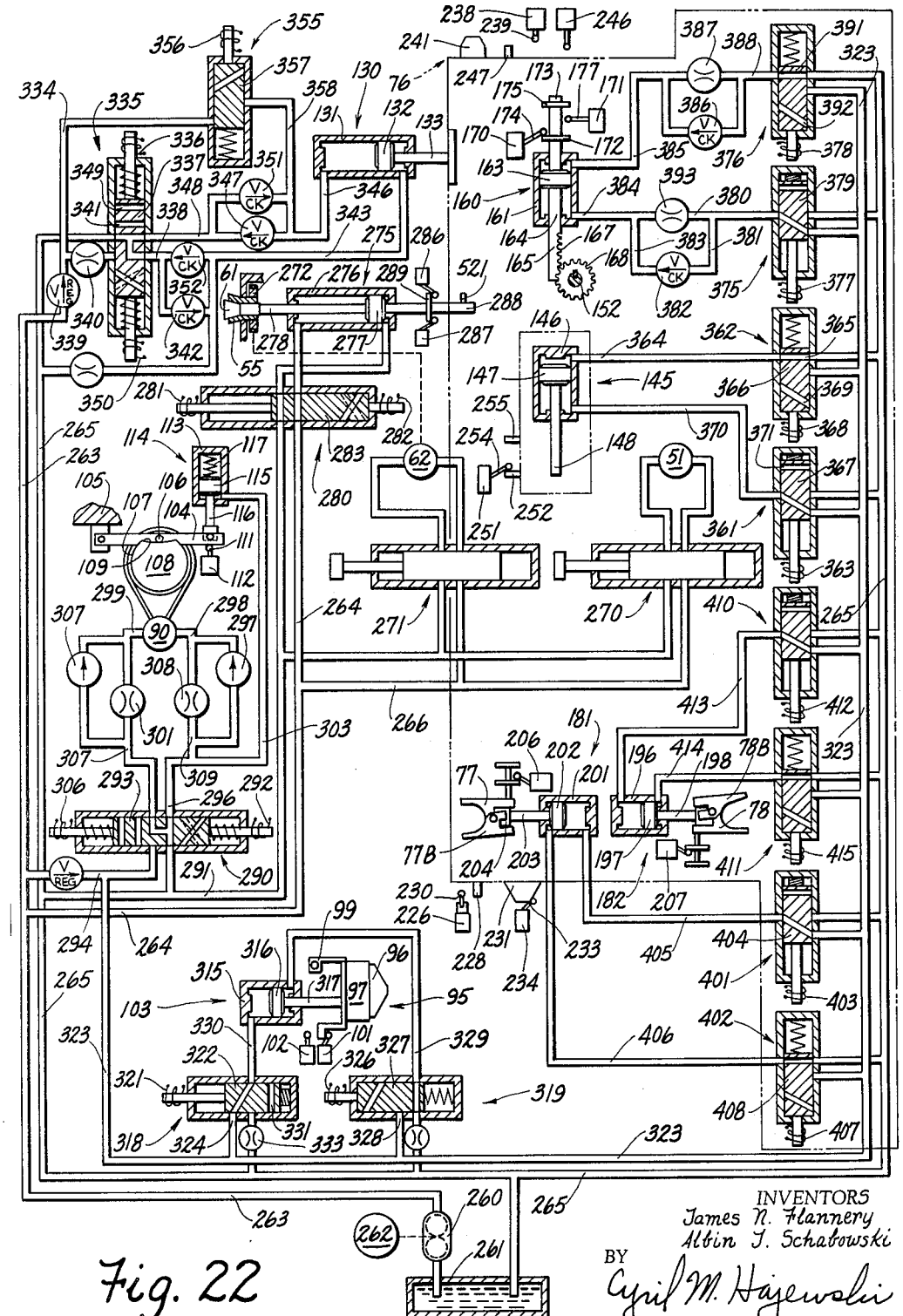
Figure 23:
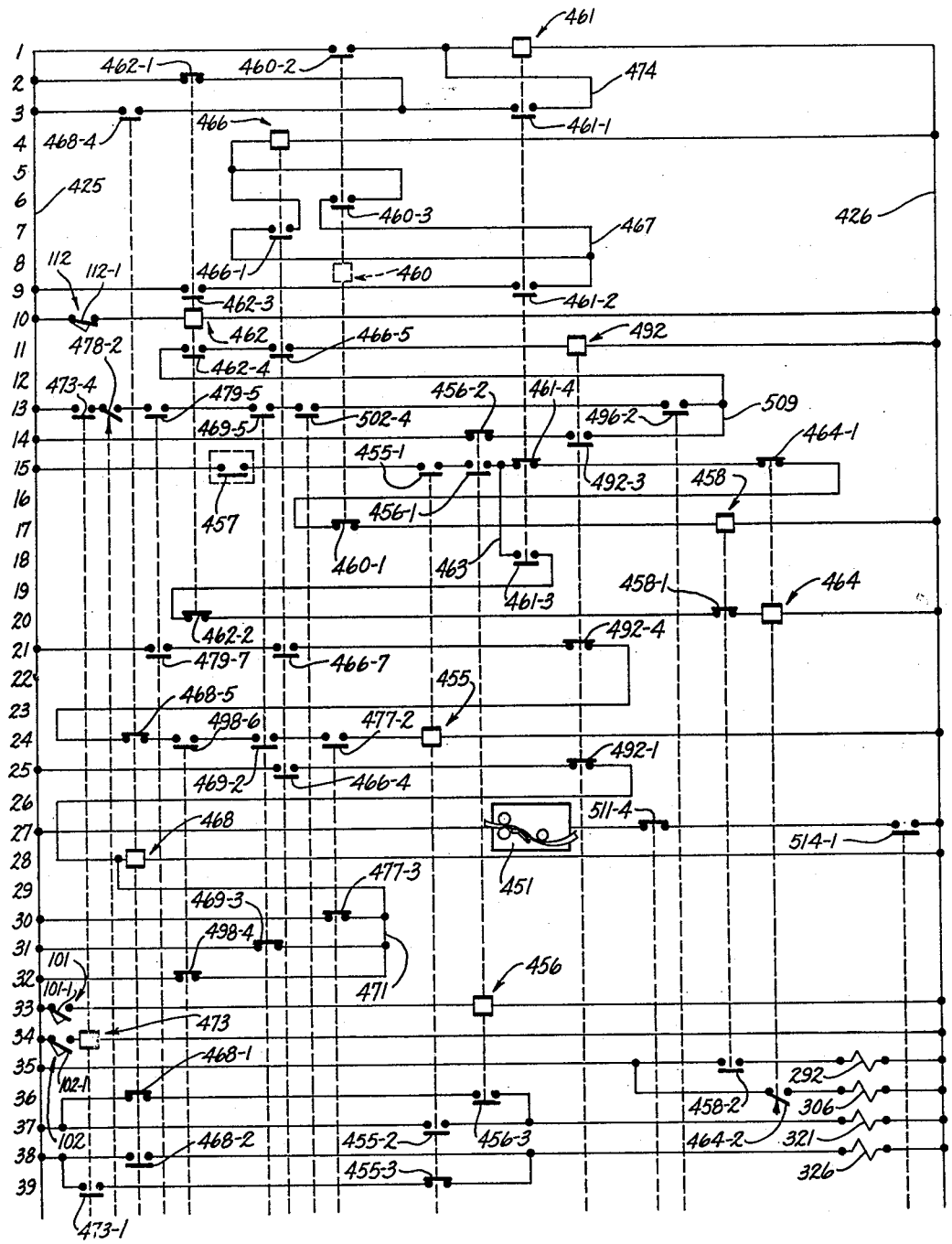
Figure 24:
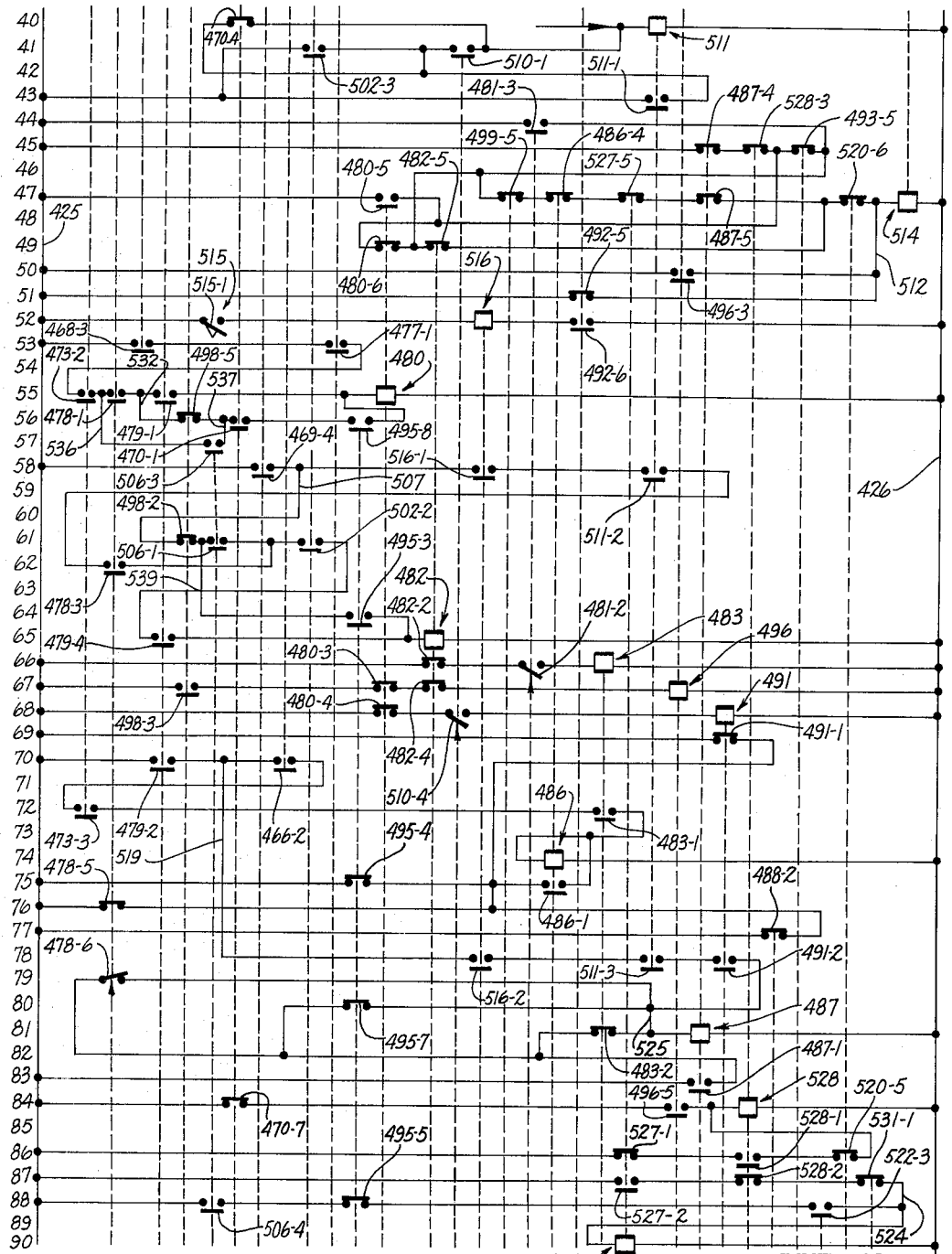
Figure 25:
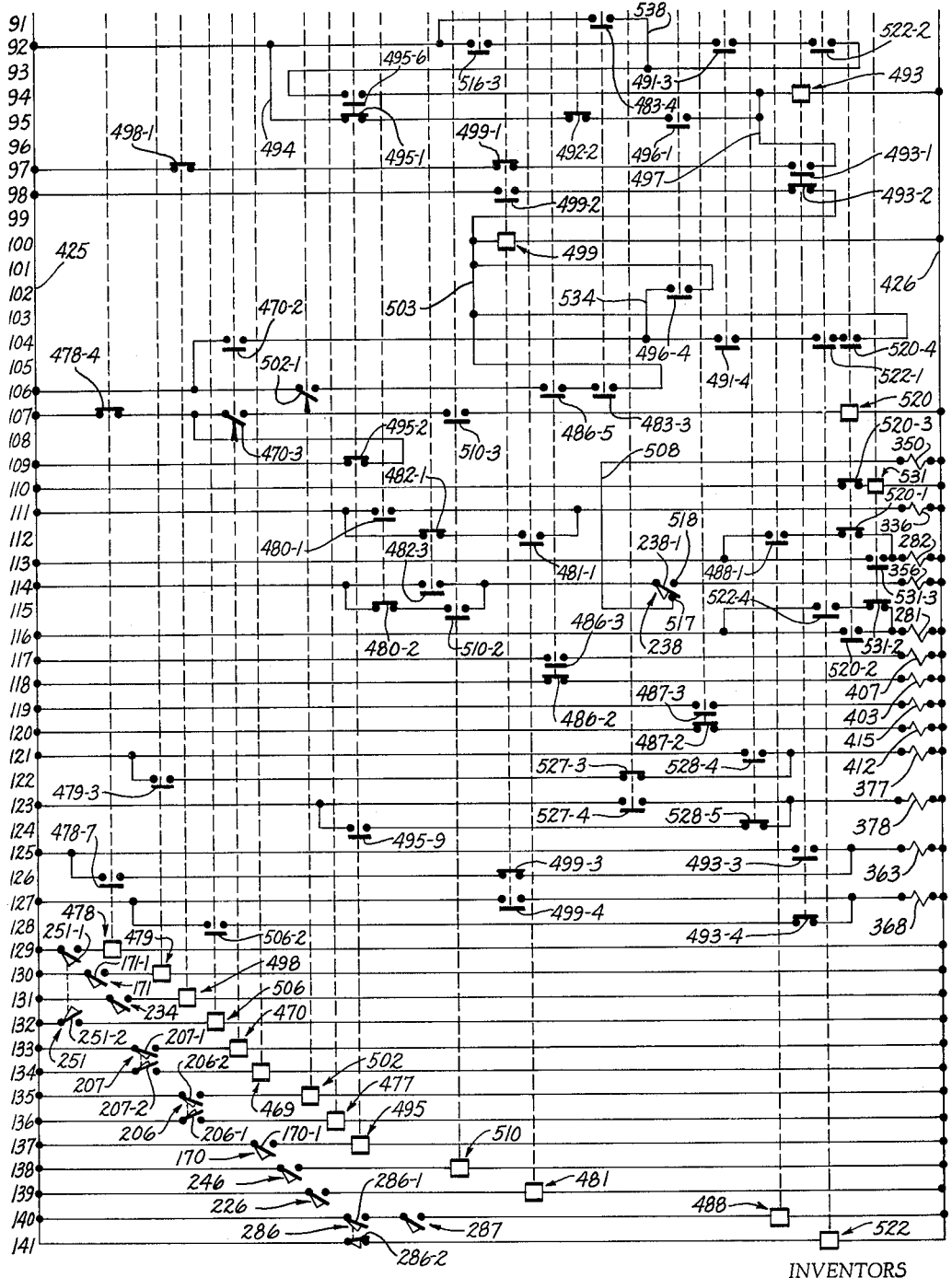

FIGS. 7 to 21, inclusive, are a series of diagrammatic perspective views of the tool changer, spindle and magazine, showing the various positions of each component during various portions of a tool selecting operation, as well as during a tool change cycle of operation;

FIG. 22 is a diagrammatic view of the hydraulic circuit; and,

FIGS. 23, 24 and 25, taken together, constitute a wiring diagram illustrating the electrical control circuit for controlling the operation of the various components in a tool selecting and a tool change cycle of operation.

GENERAL MACHINE ARRANGEMENT

Reference is now made more particularly to the drawings and specifically to FIGS. 1 and 2 thereof illustrating a machine tool incorporating the features of the present invention. The machine comprises generally a bed 40 which slidably supports an upstanding column 41 having a base 42. The bed 40 is provided with horizontal way surfaces 43 which are engaged by complementary way surfaces (not shown) formed at the bottom of the column base 42 to support the column for sliding movement along the length of the bed 40. The movement of the column along the bed 40 constitutes one axis of movement of the machine which is to be known as the X axis as indicated by the arrow in FIGURES 1 and 2. A plurality of slidable plates 44 and 45 are attached to the bed 40 and the column base 42 at either end of the base 42 and are arranged in telescoping manner so as not to interfere with the longitudinal movement of the column 41 while providing a protective covering over the way surfaces 43 to prevent the chips which are formed during a machining operation from falling onto the way surfaces.

The column 41 is provided with vertical way surfaces 48 for engagement by complementary way surfaces 49 provided on a spindle head 50 for slidably supporting the spindle head in a vertical path of travel along a Y axis as indicated by the arrow in FIGURE 1. Vertical movement of the spindle head along the Y axis in either direction is effected through the operation of a motor 51 which is mounted on a column cap 52 which, in turn, is secured to the top surface of the column 41 and is arranged to overhang the column. The motor 51 is operatively connected to drive a screw 53 which is in threaded engagement with a recirculating ball bearing thread nut (not shown) that is fixed to the spindle head 50. The screw 53 is rotatably supported by the column 41, being journaled at its upper end in the cap 52. The lower end of the screw 53 is journaled in a suitable bearing (not shown) that is attached to the column base 42.

The spindle head 50 constitutes the operating station of the machine tool and rotatably supports a spindle 55 that is adapted to carry a tool 60 to rotate with the spindle, the tool being operatively maintained within the spindle by means of a collet 61 which is shown schematically in FIG. 22. The spindle 55 is rotated by a suitable motor 62 in a well-known manner for actuating the tool 60 in a machining operation.

The spindle 55 supports a tool 60 in position to operate upon a workpiece W which is secured in well-known manner on a rotary index table 63 that, in turn, is mounted on a movable saddle 64. The saddle 64 is supported for transverse sliding movement toward and away from the column 41 along way surfaces 66 formed on the top surface of a laterally extending auxiliary bed 65. Such movement of the saddle 64 is identified as the Z axis of movement as indicated by the arrow in FIGURE 2. The saddle 64 is moved by means of a motor 69 which is secured to the end of the bed 65 and is operably connected to rotate a screw 68 that is in operative engagement with a recirculating ball bearing thread nut (not shown) fixed to the saddle 64. Telescoping covers 67 are provided for protecting the way surfaces 66 and are arranged in well-known manner to be extended or collapsed in following the movement of the saddle 64 as it is advanced or retracted to or away from the column 41.

It is apparent that the column 41, the saddle 64 and the spindle head 50 are supported for movement in three mutually transverse paths of travel and that the rotary table 63 may be indexed about its vertical axis to present the workpiece W to the tool 60 carried by the rotating spindle 55 as may be desired. Thus, the heavy massive column 41 may be moved on the bed 40, along the X axis to its full rightward position that it occupies in FIGS. 1 and 2, for locating the spindle 55 along the X axis, while the spindle head 50 may be moved vertically along the Y axis to position the spindle in any desired vertical location with respect to the workpiece W that is carried by the table 63. In turn, the saddle 64 may be moved in an advancing movement towards the column 41 to advance the workpiece W to the accurately located spindle 55 so as to feed the workpiece to the rotating tool 60.

The machine tool illustrated in FIGS. 1 and 2 is equipped with an automatically operable mechanical tool changer 70 which is supported for horizontal movement between a tool storage magazine 71 and the spindle 55 regardless of the horizontal distance that the spindle 55 is located from the storage magazine 71. A plurality of diverse tools 60 are stored in the magazine 71 where they are made available for transfer to the spindle 55. A tool change arm 75 is supported by a carrier 76 which serves to transport the tool change arm 75 in its various movements for performing its function of withdrawing a selected tool 60 from the magazine 71 and thereafter transporting the selected tool to the spindle where it will insert the selected tool into the spindle 55 to render it operative for performing a machining operation. The tool change arm 75 also operates to withdraw the tool 60 already located in the spindle 55 and transport it back to the magazine 71 and place it therein for storage.

The carrier 76 is carried for horizontal movement along a path which is parallel to the X axis for the purpose of transporting the arm 75 into a position where it will engage a tool 60 located in a tool ready position and thereafter transport the tool to the remotely located spindle 55. In FIGS. 1, 2 and 7, the tool changer 70 is shown located in its parked or idle position, out of the path of travel of the spindle head 50 and the magazine 71. When a tool change is to be effected, the carrier 76 is actuated leftwardly to move the tool change arm 75 from the parked position into engagement with a tool that has been located by the magazine 71 in the tool ready station.

The tool change arm 75 is provided with a pair of identical tool grips 77 and 78 which extend in opposite directions relative to each other. The tool grips 77 and 78 are each provided with substantially semicircular surfaces 79 for receiving a collar 81 provided on each tool 60. The tool grips 77 and 78 include fixed fingers 77A and 78A respectively, and movable fingers 77B and 78B respectively, as shown in FIG. 4. The movable fingers 77B and 78B of the grips 77 and 78 respectively, are operable to positively retain the tools 60 within the semicircular surfaces 79 in a manner to be subsequently described.

TOOL CHANGE CYCLE

FIGS. 7 to 20, inclusive, diagrammatically illustrate a cycle of operation of the tool changer 70 in replacing a tool 60 in the spindle 55. FIG. 7 shows the tool changer in an initial position wherein the tool change arm 75 is in the parked position and located so that it does not interfere with the rotational movement of the magazine 71 nor with the operational movement of the spindle 55. In response to a proper signal obtained from a record, the magazine 71 is operated for locating the next desired tool at a tool ready position in which a tool, such as the tool 60A, is positioned for engagement by the grip 77 of the arm 75. With the desired tool located at the tool ready position, a signal will be obtained to effect the leftward movement of the carrier 76, as viewed in FIG. 7, so that the tool grip 77 is moved into engagement with the collar 81 of the tool 60A presented by the magazine 71. Leftward movement of the carrier 76 moves the tool change arm 75 to the position shown in FIG. 8, wherein the grip 77 is in engagement with the tool 60A that is located in the tool ready station by the magazine 71.

With the grip 77 in engagement with the tool 60A presented by the magazine 71, the movable finger 77B of the grip 77 is actuated towards the fixed finger 77A to lock the tool 60A in the semicircular recess 79 of the grip. The arm 75 is then moved outwardly to extract the tool from its storage socket in the magazine 71, as depicted in FIG. 9. Thereafter, the carrier 76 is moved rightwardly to return the tool change arm 75 to the parked position, as depicted in FIG. 10, and thence to the retracted position, as depicted in FIG. 11, where it holds the tool 60A in readiness for transfer to the spindle 55. This cycle of operation is accomplished while the spindle is operating with a previously changed tool and, as a result, when a tool change is to be accomplished, there is no time loss in first selecting and removing a tool from the magazine prior to tool change.

It will be noted that in FIGS. 7 to 11 inclusive, the spindle head 50 is located in a lower position so that the spindle 55 is not in a tool change position. As depicted in these figures, the spindle 55 is being utilized to drive the cutter 60B in performing a work operation on the workpiece W that is carried by the rotary table shown in FIGS. 1 and 2. At this time, the tool change arm 75 with the cutter 60A held in its grip 77, is in a retracted and parked position to await the completion of a work operation that is being performed by the spindle 55 with the cutter 60B. When the work operation has been completed, the workpiece will be retracted by movement of the saddle 64 in a direction away from the column 41 to thereby move the workpiece W free and clear of the cutter 60B. The spindle head 50 will thereupon be moved along the Y axis to a predetermined vertical location referred to as a tool change position so that the collar 81 of the tool 60B carried by the spindle 55 will be in horizontal alignment with the grip 78 of the tool change arm 75, as illustrated in FIG. 12. As therein illustrated, the spindle 55 is now located in the required position for a tool change operation in which the tool 60B is removed therefrom, and the new tool 60A is inserted therein, for a subsequent operation on the workpiece W.

The carrier 76 is now moved rightwardly, as viewed in FIG. 13, thereby moving the arm 75 rightwardly, wherein the tool grip 78 engages the collar 81 of the tool 60B presented by the spindle 55, as depicted in FIG. 13. Thereafter, the movable finger 78A of the grip 78 is actuated to firmly secure the tool 60B within the semicircular recess 79 of the grip 78. The spindle collet 61 is released and the arm 75 is moved outwardly away from the column 41, thereby extracting the cutter 60B from the spindle 55, as depicted in FIG. 14.

After the tool 60B has been extracted from the spindle 55, the tool change arm 75 is rotated 180° in a counterclockwise direction, as viewed in FIG. 1, and as indicated by the arrows in FIG. 14. In this operation, the drill 60B will be moved out of alignment with the spindle 55, while the milling cutter 60A will be moved into alignment with the spindle 55, so that it is positioned for insertion into operating engagement with the spindle 55, as shown in FIG. 15.

With the positions of the milling cutter 60A and drill 60B interchanged by one half revolution of the tool change arm 75, the latter will be retracted to insert the milling cutter 60A into operative engagement with the spindle 55, as illustrated in FIG. 16.

With the milling cutter 60A now inserted into the spindle 55, the spindle collet 61 is operated to secure the tool in the spindle and the grip 77 is actuated so that the movable finger 77B is pivoted outwardly to release the tool. From the position in FIG. 16, the tool carrier 76 is moved in a leftward direction thereby moving the tool change arm 75 in a leftward direction, disengaging the grip 77 from the milling cutter 60A. The leftward movement of the carrier is continued until such time as the tool change arm 75 is located in the parked position, depicted in FIG. 17. In this position, the grip 77 is free and clear of the milling cutter 60A and will not interfere with a subsequent operation of the spindle 55. Thus, as depicted in FIG. 18, the spindle head 50 may be operated to move the spindle 55 into a position to perform a machining operation on the workpiece W. Simultaneously therewith, the tool change arm 75 is caused to move outwardly away from the carrier 76 so that the shank of the tool 60B will clear the peripheral surface of the storage member of the magazine 71 upon subsequent leftward movement of the tool change arm 75. Therefore, the tool change arm 75 is in the position as depicted in FIG. 18, wherein the grip 77 is free and clear of the spindle 55 and is in its released position, while the grip 78, in clamped condition, holds the drill 60B free and clear of the magazine 71. With the arm 75 in the position depicted in FIG. 18, the carrier 76 is again moved leftwardly from the parked position so that the arm 75 moves out of the parked position and into a position wherein the drill 60B carried by it is moved into alignment with a storage socket 83 of the magazine 71. This position of the tool change arm 75 is illustrated in FIG. 19, and as therein illustrated, the tool 60B is now aligned with the socket 83 so that it may be inserted into the socket for storage therein.

With the drill 60B aligned with the storage socket 83, the tool change arm 75 is moved inwardly towards the magazine for inserting the tool into the storage socket, as depicted in FIG. 20. The movable finger 78B is now actuated to release the grip 78 so that the grip may be disengaged from the tool 60B. Thereafter, the carrier 76 is moved rightwardly to return the arm 75 to the parked position depicted in FIG. 21. With the tool change arm 75 returned to the parked position depicted in FIG. 21, the tool change arm 75 is rotated 180° in a clockwise direction, as viewed from the front of the machine, and as indicated by the arrows in FIG. 21, to the position depicted in FIG. 7, wherein the grip 77 extends to the left towards the magazine 71 and the grip 78 extends towards the spindle 55. The tool change cycle is now completed and the drill 60B has been replaced in the spindle 55 by the milling cutter 60A. As previously mentioned, when the tool change arm 75 is located in the parked position depicted in FIG. 7, it does not interfere with the operation of the spindle in performing a work operation, nor will it interfere with the rotational movement of the magazine in locating the next desired tool in the tool change position.

MAGAZINE

The magazine 71 comprises an upstanding frame 86 which is supported on a base 87 adjacent to the column bed. A horizontally extending shaft 88 is fixedly carried by the upstanding frame 86 and serves to rotatably support a tool carrying ring 89 which is journaled thereon for rotation in a tool selecting operation. The ring 89 is provided with a plurality of tool storage sockets 83 that are adapted to carry the several tools 60 stored therein. Rotational movement of the tool storage ring 89 in either direction is effected by means of a motor 90 which is connected to drive a pinion 91 that is disposed in meshing engagement with a relatively large gear 92 that is secured to the storage ring 89 for effecting its rotation. The purpose of the tool carrying ring 89 is to carry the variety of tools 60 in storage and to transfer the selected tools individually to a tool change ready position, or ready station 73, where they are accessible to the tool change arm 75, as previously described.

In the present instance, each of the tools 60 is identified by a number from 1 to 31 inclusive, and they are each coded in accordance with the binary system to indicate the number of the tool. As well known in the art, in the binary system each digit of a binary number is either "off" as indicated by a "0," or "on" as represented by a "1." Since 31 numbers are required in the illustrated embodiment to identify the thirty-one tools, five digits of the binary system must be provided. Thus, the number 00001 will identify tool No. 1, while the binary number 11111 will identify tool No. 31. Five peripheral strips about the collar 81 of the tool 60 are therefore designated to constitute the coding, with each of the strips representing one of the digits of the binary system in the present example. Each of these peripheral strips may be provided with a peripheral land or ring 93 to indicate the numeral 1 for that particular digit of the binary number, and the absence of a peripheral ring 93 along any of the peripheral strips indicates the numeral 0 for that particular digit of the binary system. For a more detailed description of the coding structure, reference may be had to Patent 3,052,011 issued to W. E. Brainard et al.

READING HEAD

Such coding of the tools 60 is read by a tool selector or reading head generally identified by reference numeral 95, which is shown in FIGS. 1, 2 and 3. Prior to actuating the motor 90 for rotating the ring 89, the identification number of the desired tool is impressed upon the electrical control system either manually or automatically. Then, as the ring 89 is rotated, the tool reading head 95 will read the code on the collar 81 of each of the tools as the tools are moved past the reading head by the rotation of the ring 89. When the number read on the collar 81 by the reading head 95 coincides with the number impressed upon the electrical control system, the electrical control system will operate to deactuate the motor 90 and stop the rotation of the ring 89.

As best shown in FIG. 3, the tool reading head 95 includes a plurality of movable fingers 96 that extend from a housing 97 into engagement with the rings 93 on the collar 81 of the tool 60 that have been designated to contain the coding for identifying each tool. The actuation of the various fingers 96 by the rings 93 on collar 81 of the tool 60 as the tools move past the reading head will actuate the fingers 96 inwardly within the housing for actuating switches [not shown] in different combinations, these switches constituting tool selection switches that are part of the electrical control circuit. In FIGS. 3 and 22, the reading head 95 is shown in forward advanced position, in position to engage the rings 93 on the collars of the tool 60. However, once the desired tool is selected and located at the tool ready position 73, the reading head must be retracted to retract the fingers 96 out of engagement with the rings 93 to allow the extraction and insertion of a tool into the storage sockets of the storage ring 89. To this end, the reading head housing 97 is supported on a bracket 98 which is fixedly carried by the outer extending end of the shaft 88. The housing 97 is pivotally carried by the bracket 98 by means of a pivoting bracket 99 shown schematically in FIG. 22. To indicate the position of the reading head 95, a pair of limit switches 101 and 102 are provided with the limit switch 101 functioning to indicate in the electrical control system that the reading head 95 is in an advanced position, while the limit switch 102, when actuated, will indicate in the electrical control system that the reading head 95 has been retracted. The pivotal movement of the reading head into forward advanced position, or into a retracted position, is effected by means of a fluid actuator 103.

MAGAZINE POSITIONING CONTROL

The precise control of the motor 90 for accurately locating the selected tool 60 at the tool change position 73 is achieved by means of a positioning mechanism illustrated diagrammatically in FIG. 22. Generally, the positioning mechanism comprises a rocker arm 104 which is pivotally supported on a bracket 105 that is mounted on the extending end of the stationary shaft 88. The rocker arm 104 is provided with a cam follower 106 disposed to engage the peripheral surface 107 of a cam 108 that is concentrically arranged with the storage ring 89 to move with it in its rotational movement. The cam 108 is provided with a notched portion 109 in which the cam follower 106 is disposed to engage whenever a tool is located at the ready position 73. The rocker arm 104 extends rightwardly across the cam 108, with the extending end located to engage a plunger 111 of a limit switch 112 for the purpose of actuating the switch.

During forward rotation or operation of the motor 90, hydraulic pressure is admitted to the lower end of a cylinder 113 of a fluid actuator 114, the hydraulic pressure serving to force a piston 115 upwardly. The piston 115 in moving upwardly operates to move the plunger 116 upwardly and it, in turn, will move the rightward end of the rocker arm 104 upwardly, thereby releasing the actuating plunger 111 of the limit switch 112. When the forward rotation of the motor 90 is terminated, and during the reverse rotation of the motor 90 at a creep rate, the hydraulic pressure is withdrawn from the cylinder 113 and a spring 117 contained in the upper end of the cylinder 113 above the piston 115 will operate to effect downward movement of the piston 115 thereby causing the arm 104 to be lowered so that the follower 106 will engage the peripheral surface of the cam 108.

Each revolution of the output shaft of the motor 90 operates to rotate the ring 89 through an angle of 12° so that one of the tool storage sockets 83 is moved out of the tool change position 73 and the succeeding storage socket 83 is brought into alignment with the tool change position 73. When a tool storage socket 83 is accurately located at the tool ready station 73, the notched portion 109 of the cam 108 will be engaged by the follower 106 on the rocker arm 104. Under this condition, the rightward end of the rocker arm 104 will be in its lowermost position and will actuate the plunger 111 of the limit switch 112 to signify that the tool is located in the ready position 73 and to stop the operation of the motor 90. However, upon termination of the operation of the motor 90, the desired tool will have slightly overrun the tool change position, and therefore, the notched portion 109 of the cam 108 will not be in position to receive the cam follower 106. The cam follower 106 will therefore be riding on the peripheral surface 107 of the cam 108, and as a result, the rightward end of the rocker arm 104 will be elevated so that the actuating plunger 111 of the limit switch 112 is released. As the motor 90 is operated in the reverse direction at a creep rate, the spring 117 will apply a force to the rightward extending end of the rocker arm 104 and when the notched portion 109 moves under the cam follower 106, the rocker arm will then be pivoted to its lowermost position into engagement with the plunger 111 of the limit switch 112 to actuate the switch.

Actuation of the limit switch 112 serves to deenergize a solenoid valve for terminating operation of the motor 90, and one of the tool storage sockets 83 containing the selected tool 60 will then be accurately positioned at the tool ready position 73. The tool change mechanism is then operated to withdraw the selected desired tool from the storage socket and to hold it in readiness for its subsequent insertion into the spindle 55, as previously described.

TOOL CHANGER

As previously mentioned, the tool change mechanism 70 is supported for horizontal movement in a direction parallel to the direction of movement of the column 41 for the purpose of carrying the tool that has been extracted from the magazine 71, to the spindle 55, regardless of the position of the spindle along the X axis after the completion of a work operation. With the present invention it is unnecessary to move the column along the X axis on the way surfaces 43 to a predetermined home position in order that the tool carried by the spindle 55 may be changed. The only requirement is that the spindle head 50, which is a relatively small structure, be moved to a predetermined position along the Y axis so as to position the spindle directly across from the tool grip 78 of the tool change mechanism. Thus, with the present invention, the wear on the expensive way surfaces 43 is reduced to a minimum in that the movement of the column is not necessary for a tool change operation. Not only does the present tool change mechanism eliminate the necessity of moving the column prior to every tool change, but it also reduces the time necessary for transferring a tool between the magazine and the spindle. This is true, because the carrier 76 of the tool change mechanism is relatively small and light in comparison to the massive column 41. It is apparent that moving the relatively light tool change mechanism in transporting a tool to the spindle 55 will be many times faster than moving the massive column along the way surfaces 43 to the tool change mechanism. Also, with the present invention, operation of the magazine and reading head in a tool selecting operation may be effected while the spindle 55 is being operated to perform a machining operation on the workpiece W. Thus, the time interval in selecting a tool for location in the ready position is entirely eliminated in the tool change cycle, thereby saving additional time in effecting a tool change. It should also be apparent that with the present tool change mechanism, the means for identifying the next desired tool may be either identifying the individual tool as described, or identifying the position of the tool in the storage ring 89. It is obvious therefore that the present tool change mechanism has great utility with any method of tool selection that may be employed. With relatively large machines, the present tool changer will operate faster in effecting a tool change than any known tool change mechanism presently available.

The tool change mechanism 70 comprises the carrier 76 having a pair of tubular members 118 and 119 which serve as slidable supports for the tool change mechanism 70. Extending through each of the tubular supports 118 and 119, are extensible guide rods 120 and 121. The rightward ends of the rods 120 and 121, as viewed in FIGS. 1 and 3, are secured in a bracket 122 that is, in turn, secured to the front face of the column 41. The leftward extending end of the rods 120 and 121 are disposed to be supported by means of a rearwardly extending bracket 123 which extends outwardly from the rear face of the magazine supporting frame 86, as best shown in FIGS. 2 and 3. The rods 120 and 121 are of sufficient rigidity to support the tool change mechanism as it is moved thereon towards the spindle 55 in a tool transfer movement. With the column 41 positioned rightwardly on the bed 40, as depicted in FIG. 1, the guide rods 120 and 121 will have moved with the column sliding in suitable openings provided in the brackets 123, thereby providing a clear unobstructed guideway for the carrier 76 of the tool change mechanism 70. As the column is moved leftwardly, as viewed in FIGS. 1 and 2, the guide rods 120 and 121 will move leftwardly with the column and the leftwardly extending ends of the rods will slide in the openings provided in the bracket 123. Upon further leftward movement of the column 41, the extending ends of the rods will pass through suitable aligned openings 124 provided in another bracket 125 which also extends rearwardly from the magazine supporting frame 86. Upon continued leftward movement of the column 41, the rods 120 and 121 will also continue to move leftwardly with the free ends thereof being received in suitable aligned openings provided in another bracket 126 carried by an upstanding pedestal 127 located at the leftward end of the bed 40 adjacent thereto. Thus, movement of the column 41 along the X axis in either direction will effect like movement of the rods 120 and 121 with their free ends being supported by means of the brackets 123, 125 and 126, depending upon the position of the column 41. The rods 120 and 121 constitute an extensible guide which is operable to provide an unobstructed guide path for the tool change mechanism 70 between the tool storage magazine and the spindle regardless of the lateral position of the spindle at the time of the tool change operation.

The carrier 76 is moved along the guide rods 120 and 121 by a fluid actuator 130 comprising a cylinder 131 that is carried by the upstanding magazine frame 86 and pedestal 127 on the brackets 123, 125 and 126. The cylinder 131 is mounted on the brackets 123, 125 and 126 in a position intermediate the openings provided in these brackets through which the guide rods slide. The cylinder 131 is adapted to slidably support a piston 132 which is provided with a piston rod 133. As shown in FIG. 3, the outward extending end of the piston rod 133 is engaged in a suitable threaded opening provided in the end of the carrier 76. Thus, movement of the piston 132 within the cylinder 131 will effect a like movement of the carrier 76.

The various positions of the tool change mechanism 70 are indicated in the electrical control system by means of a plurality of limit switches. Thus, when the tool change mechanism 70 is in the position adjacent the magazine 71, as depicted in FIG. 8, in which the grip 77 is engaged with a tool 60A, a limit switch 226, shown in FIG. 3 and schematically in FIG. 22, is actuated. The limit switch 226 is carried by a bracket 227 which is mounted on the rear surface of the upright magazine supporting frame 86. The switch 226 is actuated by a screw 228 that is adjustably supported in the extending end of a bracket 229 mounted on the top surface of the tubular sleeve 118, shown in FIG. 3. Thus, when the tool change mechanism 70 is moved into the position depicted in FIG. 8, the screw 228 will engage the actuating arm 230 of the limit switch 226 to actuate the switch. The actuated switch will operate to indicate in the electrical control system that the tool change mechanism 70 is in position wherein the grip 77 is in engagement with a tool 60 presented by the magazine 71 at the tool ready station 73.

When the tool change arm 75 is fully extended, withdrawing a tool 60 from the magazine, it will be moved rightwardly from the position depicted in FIG. 9, into the parked position depicted in FIG. 10. With the tool change mechanism 70 in the parked position, a dog 231, that is secured to the extended end of a bracket 232 carried on the tubular sleeve 118, will engage an arm 233 of a limit switch 234 to move the arm upwardly, as viewed in FIG. 3, or to the right, as schematically shown in FIG. 22. This will actuate the switch 234 and it will operate to indicate in the electrical control system that the tool change mechanism 70 is in the parked position.

From the parked position, the tool change mechanism 70 is moved rightwardly, as viewed in FIGS. 2 and 3, towards the spindle 55 for the purpose of interchanging tools. The movement of the tool change mechanism 70 from the parked position is at a rapid rate which must be decreased to a much slower rate, as the tool change mechanism 70 approaches the spindle 55. This is necessary because as the rightwardly extending grip 78 engages with the tool extending from the spindle 55, the rate of movement of the tool change mechanism 70 must be just sufficient to insure a positive engagement of the grip 78 with the tool. To effect such change in the rate at which the tool change mechanism 70 is moved, and also to indicate in the electrical control system the position of the tool change mechanism, a limit switch 238 is provided on the side of the column adjacent to the guide rails 120 and 121. The actuating arm 239 of the limit switch 238 is located in a position where it will be engaged by a dog 241, depicted in FIG. 3. As the tool change mechanism 70 is moved from the parked position shown in FIG. 12, rightwardly towards the spindle 55, the dog 241 will engage the arm 239 of the limit switch 238 to actuate the switch which operates to effect a decrease in the rate at which the tool change mechanism 70 is moved. The actuation of the limit switch 238 is accomplished when the tool change arm 75 is a predetermined distance from the spindle, which distance will allow time for the carrier 76 to slow to an approach rate of travel.

With the tool change mechanism 70 positioned at the spindle 55, wherein the grip 78 engages the tool 60B extending from the spindle, a limit switch 246 is actuated by a dog 247 which is also carried on the tubular sleeve 118, shown in FIG. 3. Actuation of the limit switch 246 will indicate in the electrical system that the tool change mechanism 70 is in proper position and that the grip 78 may be clamped.

The carrier 76 is provided with an L-shaped bracket, generally identified by the reference numeral 135, that is adapted to support the tool change arm 75 for movement with the carrier and also for rotational and axial movement. To this end, a leg 136 of the bracket 135 is securely attached as by welding to the carrier 76. The outwardly extending leg 137 of the bracket 135 is a fabricated box-like structure forming a horizontal transversely extending pocket or chamber 138, shown in FIG. 6. Movement of the tool change arm 75 towards and away from the column in inserting or extracting the tool either from the magazine 71 or from the spindle 55 is accomplished by means of a slide 141 which is supported for sliding movement in a direction transverse to the direction of the movement of the carrier 76 on way surfaces 142 and 143. The way surfaces 142 and 143 are secured to a vertical extending plate 144 which, in turn, is secured to an upright side plate 140 of the leg 137. The transverse movement of the slide 141 in either direction, i.e., away from the column or towards the column, is accomplished by means of an actuator 145 comprising a cylinder 146 that is disposed within the chamber 138 in a horizontal position, being attached to the left side surface of the upright plate 140 of the leg member 137. A piston 147 slidably supported within the cylinder 146 is provided with a piston rod 148, the free end of which is adapted to be secured to an inwardly extending bracket 149 by means of a connector 150, shown in FIGS. 3 and 6. The bracket 149 is secured to the inner surface of the slide 141 and is disposed to extend inwardly through a suitable recess 151 formed in the forward end of the plate 144. Thus, energization of the actuator 145 will effect movement of the slide 141 in one direction or the other, depending upon the direction in which the piston 147 is moved.

The extended or retracted position of the tool change arm 75 is indicated in the electrical control system through the operation of a limit switch 251 which is secured on the top surface of the leg 137, shown in FIGS. 3 and 6. With the slide 141 in a retracted position on the bracket leg 137, the tool arm 75 is in a retracted position, depicted in FIGS. 3, 7 and 13, and a screw 252 adjustably carried by a bracket 253, which is mounted on the leg 137, engages the actuating arm 254 of the limit switch 251. Under this condition, the arm 254 is moved in a counterclockwise direction, as viewed in FIG. 3, and actuates the limit switch so that it operates to indicate in the electrical control system that the tool change arm 75 is in a retracted position. On the other hand, with the tool change arm 75 moved to the extended position depicted in FIGS. 9, 14 and 19, the arm 254 will be engaged and moved in a clockwise direction, as viewed in FIG. 3. Such clockwise movement of the limit switch arm 254 is effected by means of another screw 255 that is adjustably carried by a bracket 256 shown in FIG. 3.

As previously mentioned, the tool change arm 75 is required to be rotated 180° for the purpose of effecting an interchange of tools with the spindle 55. To this end, the tool change arm 75 is mounted on the outwardly extending end of a horizontally disposed shaft 152 and is secured thereon by means of a nut 153 which is threadedly engaged on a threaded reduced portion 154 of the shaft 152. A drive connection between the shaft 152 and the tool change arm 75 is established by means of a key 155, shown in FIG. 4.

A fluid actuator 160 is provided to effect the 180° pivotable movement of the tool change arm 75 from its initial position depicted in FIG. 14, into the position depicted in FIG. 15, and also to effect the reverse pivotal movement of the tool change arm in a clockwise direction, as viewed in FIG. 21 and indicated by the arrows therein. The fluid actuator 160 comprises a cylinder 161 which is secured in upright position to the top surface of a vertically disposed tubular housing 162 integrally formed with the slide 141, shown in FIGS. 3 and 6. A piston 163, schematically shown in FIG. 22, is reciprocally supported within the cylinder 161 and is provided with a piston rod 164 that extends downwardly and outwardly of the cylinder 163. The outer end of the piston rod 164 is threadedly connected into the upper end of a piston 165 that is supported for reciprocal movement in a bore 166 of the housing 162. A rack 167 formed on the piston 165 is disposed in meshing engagement with a pinion 168 that is keyed on the shaft 152. Thus, downward movement of the piston 163 will effect like movement of the rack 167 for rotating the pinion 168 in a counterclockwise direction, as viewed in FIGS. 6 and 22. This counterclockwise direction of rotation of the pinion 168 effects like movement of the shaft 152 and, in turn, the like counterclockwise rotation of the tool change arm 75. On the other hand, an upward movement of the piston 163 from a lowermost position in the cylinder, so as to return the piston rod to the position shown in FIG. 22, will cause the pinion 168 to rotate in a clockwise direction thereby pivoting the tool change arm 75 in a clockwise direction back into its initial position.

The horizontal 0° or initial position of the tool change arm 75 is established by means of an abutment 156 which is secured to the rear surface of the tool arm housing 183, shown in FIG. 3. With the tool arm 75 in the horizontal initial position depicted in FIGS. 3 and 4, the abutment 156 is in engagement with the under surface of a fixed positive stop 157 that is secured to the side of the bracket 149 and extends outwardly of the chamber 138. On the other hand, when the tool arm 75 is rotated in a counterclockwise direction to a 180° tool interchange position, this position is established by means of another abutment 158 also secured to the rear surface of the housing 183. The abutment 158 is adapted to engage the top surface of the positive stop 157 so as to locate the tool arm 75 in a horizontal position, which is 180° displaced from the 0° or initial position of the tool arm.

The position of the tool change arm 75 is indicated in the electrical control system by means of the limit switches 170 and 171, shown in FIG. 6 and diagrammatically in FIG. 22. When the tool change arm 75 is in the initial or 0° position shown in FIGS. 7 to 14 inclusive, the piston 163 of the actuator 160 is in its uppermost position within the cylinder 161. Under this condition, a collar 172 which is secured to the extending end of a rod 173 that is attached to the piston 163 and extends outwardly and through the upper end of the cylinder 161 engages the actuating plunger 174 of the limit switch 170 to thereby actuate the switch and indicate in the electrical control system that the tool change arm 75 is in its initial 0° position. On the other hand, when the tool change arm 75 has been rotated from its initial 0° position 180° to the position depicted in FIGS. 15 to 21 inclusive, the piston 163 will have been moved to its lowermost position within the cylinder 161, thereby moving the rod 173 downwardly with it so that another collar 175, carried on the upper end of the rod 173 is moved into engagement with the actuating plunger 177 of the limit switch 171 to actuate the limit switch and thereby indicate in the electrical control circuit that the tool change arm 75 has been rotated to 180° to a tool interchange position. The limit switches 170 and 171 are mounted on a plate 178, depicted in FIG. 6, that is attached to the cylinder 161 of the actuator 160.

TOOL GRIPS

As previously mentioned, the tool change arm 75 is provided with tool grips 77 and 78 which are individually operable to grip or release a tool. An actuator 181 is provided for the grip 77 and is operably connected to effect the pivotable movement of the movable finger 77B thereof. Similarly, a fluid actuator 182 is provided for operating the grip 78 and it is operably connected to effect the pivotable movement of the movable finger 78B of the grip 78. The grips 77 and 78 are identical in construction and operation and therefore it is only deemed necessary to describe the grip 78 and its actuating mechanism and the description given for this tool grip will also apply for the grip 77.

As best illustrated in FIG. 4, the tool change arm 75 comprises the housing 183 presenting a leftward extension 184 and a rightward extension 186 which serve to support the actuating mechanisms of the grips 77 and 78 respectively. The extension 184 is provided with the outwardly extending fixed finger 77A of the grip 77 while the extension 186 is provided with the outwardly extending fixed finger 78A of the grip 78. The movable or pivotal finger 78B of the grip 78 is supported for movement by a pin 187 that is carried by a projection 188 which is formed rearwardly of the fixed finger 78A. The pivotal movement of the finger 78B about the pin 187 is effected through a rearwardly extending arm 189 that projects inwardly into the housing or extension 186, shown in FIGS. 4 and 5. Thus, downward movement of the arm 189 will effect an upward or counterclockwise movement of the finger 78B about the pin 187. On the other hand, an upward movement of the arm 189 will effect the clockwise movement of the finger 78B about the pin to move the finger into the position it occupies as shown in FIG. 4. Movement of the arm is effected by means of a sliding block 191 which is supported for sliding movement in a guideway 192 formed within the extension 186. The block 191 is provided with an inclined cam guideway 193 that slidably receives a cam 194 formed on the end of a pin 195 which is disposed in a suitable opening provided in the end of the arm 189 of the movable finger 78B. Thus, a rightward movement of the block 191 from the position in FIGS. 4 and 5 will cause the arm 189 of the movable fingers 78B to move downwardly to effect a counterclockwise movement of the finger 78B about the pin 187 so that the finger is moved to open position. Conversely, a movement of the block 191 in a leftward direction will effect the upward movement of the arm 189 so that the finger 78B moves in a clockwise direction about the pin 187 into clamped position. The movement of the block 191 will effect the movement of the finger 78B in the manner described by reason of the fact that the cam 194 engaged in the cam guideway 193 will be forced to track within the guideway. Thus, as the block 191 moves to the right, the guideway 193 will move rightwardly so that the relatively stationary cam 194 is forced downwardly thereby effecting downward movement to the arm 189. On the other hand, as the block 191 moves leftwardly, the cam guideway 193 moves rightwardly so that the cam 194 in following the guideway is moved upwardly carrying the arm 189 with it.

Selective movement of the block 191 is effected by means of the actuator 182 comprising a cylinder 196 in which a piston 197 is supported for reciprocal movement. The piston 197 is provided with a piston rod 198 that extends outwardly of the cylinder and is secured to the block 191. A similar arrangement is provided for the movable finger 77B of the grip 77 in that the actuator 181 comprises a cylinder 201 in which a piston 202 is supported for reciprocal movement. A piston rod 203 secured to the piston 202 extends outwardly of the cylinder and is secured in the block 204 which is slidably supported within the housing extension 184.

To indicate the condition of the grips, which are independently actuated as previously mentioned, there is provided a limit switch 206 which is associated with the grip 77 and a limit switch 207 which is associated with the grip 78. The switches 206 and 207 are of the type that are actuatable in one direction or the other, to indicate a particular condition. Thus, when the finger 78B of the grip 78 is moved into the position shown in FIG. 4, the actuating arm 208 of the limit switch 207 will be operated in a clockwise direction to thereby indicate in the electrical control system that the grip 78 is in a clamped condition. On the other hand, when the finger 78B has been moved in a counterclockwise direction so that the grip 78 is in a released condition, the actuating arm 208 of the switch 207 will be moved in a counterclockwise direction thereby indicating in the electrical control system that the grip 78 is in a released condition. The actuation of the limit switch arm 208 is accomplished by means of a rod 211 that is supported for axial movement in the housing extension 186. An inclined guideway 212 is formed in the rod 211 and receives a projection 213 that is formed on a plate 214. The plate 214, in turn, is secured to the block 191 so as to be movable with the block. Thus, as the block 191 is moved rightwardly, as viewed in FIG. 5, the plate 214 will move with it thereby causing the projection 213 to move within the inclined slot 212 of the rod 211. In moving rightwardly, the projection 213 will force the rod 211 downwardly into the position shown in FIG. 4.

A collar 216 threadedly engaged on the outer end of the rod 211 will engage the actuating arm 208 of the limit switch 207 upon inward or upward movement of the rod 211 to effect the counterclockwise movement of the actuating arm 208 as a result of leftward movement of the block 191. On the other hand, when the block 191 is moved rightwardly, the projection 213 moving with the plate 214 will effect axial movement of the rod 211 in a downward direction. In this movement, another collar 217, which is secured on the rod 211 in spaced relationship to the collar 216, will engage the actuating arm 208 of the limit switch 207 to effect its movement in a clockwise direction to actuate the limit switch to indicate in the electrical control system that the grip 78 is in clamped position. A similar arrangement is provided for the grip 77; thus, when the movable finger 77B of the grip 77 is in a clamped condition, a rod 221 will be in its innermost position so that a collar 222 secured to the outer end of the rod engages the actuating arm 223 of the limit switch 206. This movement of the arm 223 will actuate the switch 206 and it will operate to indicate in the electrical control system that the grip 77 is in a clamped condition. On the other hand, when the movable finger 77B has been moved to a released position, the rod 221 will be moved outwardly so that a collar 224, that is secured to the rod 221 in spaced relationship to the collar 222, will engage and actuate the arm 223 of the limit switch 206 in a clockwise direction thereby operating the switch to indicate in the electrical control system that the grip 77 is in a released position.

HYDRAULIC CIRCUIT

The hydraulic circuit for driving the various components described above is illustrated diagrammatically in FIG. 22 and comprises a pump 260 connected to draw hydraulic fluid from a reservoir 261. An electric motor 262 is operatively connected to drive the pump 260 for supplying the hydraulic fluid from the reservoir to the system under pressure. The output of the pump 260 is discharged into a pressure line 263 and a branch pressure line 264 with the exhaust fluid being carried back to the reservoir by a main return line 265. The vertical movement of the spindle head 50 along the Y axis is effected by a hydraulic motor 51 which is actuated by hydraulic pressure from the branch line 264 and a connected line 266 under the control of a hydraulic servo valve 270 that may be operated automatically in response to signals from recorded data or by the manual manipulation of the electrical circuit for controlling the operation of the spindle motor 51 for effecting the required positioning movement of the spindle 55 as desired.

The spindle 55 is driven in its rotary movement by a hydraulic motor 62 under the control of another hydraulic servo valve 271 that is likewise controlled automatically, either by signals from recorded data or by the manual manipulation of the electrical control system. The hydraulic motor 62 is connected to drive the gear 272 which is operatively connected to drive the spindle 55 through a range change transmission [not shown] which is contained within the spindle head 50. The range change transmission [not shown] in combination with the variable speed obtainable from the motor 62 provides a wide range of spindle speeds.

The collet 61 carried within the spindle 55 is operable to lock a tool within the spindle or to release a tool so that the tool may be removed from the spindle and is operated by means of an actuator 275 comprising a cylinder 276 in which a piston 277 is supported for reciprocal movement. The piston 277 is provided with a piston rod 278 which extends outwardly to the left of the cylinder 276 and is connected to the collet 61 for effecting the slight axial movement of the collet necessary to either effect a clamping operation of the collet, or a releasing operation of the collet, depending upon the direction of its movement. In FIG. 22, the piston is shown in a rightward position in which it has operated to effect the clamping of the collet 61. For energizing the actuator 275, hydraulic pressure from the line 264 is directed selectively to the cylinder 276 for actuating the piston 277 either in a releasing or clamping operation as desired. The flow of hydraulic pressure to the cylinder 276 for actuating the piston 277 is under the control of a valve 280 which is operated by energization of either a solenoid 281 or 282. Upon energization of the solenoid 281, the plunger 283 of the valve is shifted in a rightward position so as to connect the branch line 264 to the left end of the cylinder 276 for supplying fluid pressure to the cylinder for effecting the positioning movement of the piston 277 into the rightward position that it occupies. In this position of the piston 277, the collet 61 has been operated in a clamping operation. When it is desired to release the tool in the spindle 55, the solenoid 282 of the valve 280 will be energized to actuate the plunger 283 into a leftward position so as to connect the branch pressure line 264 with the right end of the cylinder 276 effecting a leftward movement of the piston 277 within the cylinder 276.

To indicate in the electrical control system that the collet 61 is clamped, there is provided a pair of limit switches 286 and 287 which are associated with the actuator 275. The piston 277 has a rightwardly extending rod 288 which extends outwardly of the cylinder 276. This rod is provided with a collar 289 which, when the piston 277 is in its full rightward position, will engage the actuating plungers of both the limit switches 286 and 287 to actuate these switches and thereby indicate that the collet 61 is in a clamped condition. On the other hand, when the piston 277 is actuated into a leftward position to thereby effect a release of the collet 61, the limit switch 287 will be released. On the other hand, the plunger of the limit switch 286 will be actuated in the opposite direction by means of a dog 521 that is schematically shown as secured to the outer end of the rod 288.

Operation of the motor 90 for rotating the tool carrying magazine ring 89 to move the tool storage sockets 83 in their circular path of travel is under the control of a directional valve 290. The valve 290 is normally positioned to connect both sides of the motor 90 to a branch return line 291 which is connected to the main return line 265. To effect a forward rotation of a tool carrying ring 89 in a tool selecting operation, a solenoid coil 292 may be energized to effect leftward movement of a plunger 293 of the valve 290 so as to connect a branch pressure line 294 to a port of the motor 90 for effecting its operation to rotate the ring 89 for advancing the tools in their circular path past the reading head 95. With the solenoid coil 292 energized, pressure will flow into a line 296 and through a check valve 297 to the line 298 and thence to the motor 90. The exhaust pressure will flow through a line 299 and thence through a throttle valve 301 which establishes the forward rate of rotation of the motor 90. The flow of exhaust fluid continues through a line 302 and the valve 290 to the branch return line 291 so that the exhaust fluid is returned to the reservoir 261 via the exhaust line 265.

The hydraulic pressure in the line 296 for driving the tool carrying ring 89 in a forward direction also flows into a branch line 303 and is directed thereby to the lower end of the cylinder 113 for effecting upward movement of the piston 115 to pivot the rocker arm 104 upwardly against the pressure of the spring 117 so that the cam follower 106 is moved out of engagement with the notch 109 of the cam 108.

When the desired tool 65 is selected by the reading head 95, the solenoid coil 292 will be deenergized to effect an interruption of the flow of fluid pressure to the motor 90 to thereby stop the advancing movement of the ring 89. However, as previously mentioned, the momentum of the ring will carry the particular selected tool past the tool change ready station so that the ring must be operated in a reverse direction at a creep rate to locate the selected tool in an accurate position in the ready station. This is accomplished through the operation of the solenoid 306 which serves to move the plunger 293 into a rightward position so that the pressure from the line 294 is directed into the line 302 and it will flow therefrom through a check valve 307 into the line 299 and thence to the motor 90. The exhaust pressure will flow from the motor 90 into line 298 and thence through a throttle valve 308 that is set to establish a slow rate of rotation of the motor 90 so that the tool carrying ring 89 will be driven in a reverse direction at a creep rate for the purpose of positioning the selected tool at the tool ready station. From the throttle valve 308, the exhaust pressure flows through a line 309 into the line 296 and thence through the valve 290 to the return line 291. During the reverse rotation of the motor 90 and the tool carrying ring 89, fluid pressure is not directed to the cylinder 113 so that the piston 115 is urged downwardly by operation of the spring 117. This forces the rocker arm 104 downwardly so that the cam follower 106 engages the peripheral surface 107 of the cam 108. The reverse rotation of the tool carrying ring 89 will continue, as previously described, until the cam follower 106 engages in the notch 109 thereby permitting the rocker arm 104 to actuate the switch 112 for stopping the operation of the motor 90. At this time, the selected tool will be accurately located at the tool ready station.

As previously mentioned, the sensing or reading head 95 is pivotally movable into tool reading position wherein the fingers 96 are positioned so as to engage with the collars of the tools 60, or the head 95 may be retracted to effect a disengagement of the fingers from a selected tool thereby being positioned into a noninterfering position. The pivotal movement of the reading head is effected by means of the actuator 103 comprising a cylinder 315 in which the piston 316 is supported for reciprocal movement. The piston 316 is provided with a piston rod 317 which is connected to the bracket 99 on which the reading head 95 is supported for pivotal movement with the bracket. Operation of the actuator 103 for advancing and retracting the reading head 95 is under the control of a pair of directional valves 318 and 319. For advancing the reading head 95, a solenoid 321 is energized for effecting a rightward movement of a plunger 322 of the valve 318 into the position shown in FIG. 22. With the valve 318 operated as described, fluid pressure from the line 294 is directed into a line 323 and by means of a connected line 324 and flows to the valve 318. The fluid pressure is directed by the valve 318 to the left end of the cylinder 315 to effect the movement of the piston 316 rightwardly into the position it occupies, as shown. In this position of the piston 316, the bracket 99 is pivoted in a counterclockwise direction, as viewed in FIG. 22, to advance the reading head whereby the fingers 96 are moved into the path of travel of the coded collar of the tools 60 so that the fingers are now positioned to read each of the tools as they move past the sensing or reading head 95. With the reading head in advanced position, a limit switch 101 is actuated to indicate in the electrical control system that the reading head is located in an advanced position.

When the desired tool 60 has been identified and selected and also located at the ready station, the reading head 95 must be retracted so as to disengage the fingers 96 from the coded collar of the tool 60 so that these fingers do not interfere with the extraction of the tool from the storage socket 83. To effect the pivotal retracting movement of the reading head 95, the solenoid coil 321 of the valve 318 is deenergized and a solenoid coil 326 associated with the valve 319 is energized. With the coil 326 energized, it will operate to effect a movement of a plunger 327 of the valve 319 into a rightward position whereby it operates to connect a fluid branch line 328 to a line 329. Thus, fluid pressure flowing in the line 323 is directed via the line 328, the valve 319, and the line 329, to the right end of the cylinder 315 to effect leftward movement of the piston 316 and thereby effect the clockwise pivotal movement of the bracket 99 to retract the reading head 95. With the reading head 95 in full retracted position, a limit switch 102 is actuated to thereby indicate in the electrical control system that the reading head is in retracted position. As the piston 316 moves leftwardly within the cylinder 315, the exhaust pressure from the left end of the cylinder 315 is directed into the connecting line 330 and flows through the valve via a now aligned passage 331 formed in the plunger 322, into a return branch line 332 and thence through a flow control valve 333 to the return line 265.

The fluid actuator 130, for effecting the selective leftward or rightward movement of the tool change mechanism 70, is under the control of a directional valve 335 which normally connects both ends of the cylinder 131 to the return line 265. Leftward movement of the tool change mechanism 70 is effected by energizing a solenoid coil 336. Energization of the solenoid coil 336 operates to effect a downward movement of the valve plunger 337 so that the valve will operate to direct fluid pressure into a line 338. Fluid pressure from the line 263 flows through a pressure regulating valve 339 and a flow control valve 340 and thence to the valve 335 with the fluid pressure being directed through the valve via a passage 341 formed in the valve plunger 337 which is now aligned with the line 338. The fluid pressure supplied to the line 338 will flow through a check valve 342 to a line 343 which is connected to the right end of the cylinder 131; this will effect the leftward movement of the piston 132 which, in turn, will operate to effect the leftward movement of the tool change mechanism 70, as previously described. The exhaust fluid from the left end of the cylinder 131 flows through a connected line 346, a check valve 347 and a connected line 348 to the valve 335. The exhaust fluid to the valve 335 will flow through the valve plunger via a passage 349 into the return line 265 to be returned to the reservoir 261.

On the other hand, energization of a solenoid 350 will effect the movement of the valve plunger 337 in an upward direction from its central neutral position to direct the fluid pressure supplied to the valve to the left end of the cylinder 131. Thus, the fluid pressure to the valve 335 will flow through the valve into the line 348 and through a check valve 351 to the line 346 and thence into the left end of the cylinder 131 to effect a rightward movement of the piston 132 for causing the tool change mechanism to move in a rightwardly direction. With fluid pressure being supplied to the left end of the cylinder 131, the fluid exhaust in the right end of the cylinder 131 will flow therefrom into the line 343, through a check valve 352 and thence through the valve 335 to the return line 265.

It will be recalled that movement of the tool change mechanism 70 in a rightward direction from the parked position shown in FIG. 1, is for the purpose of positioning the tool change arm in engagement with the previously used tool presented by the spindle 55 so that the tool change arm may extract the previously used tool from the spindle and replace the used tool with a tool that it has obtained from the magazine. This rightward movement of the tool change mechanism 70 from the parked position towards the spindle 55 is made at a predetermined maximum rate and consequently this rate must be decreased prior to the tool changer reaching the end of its rightward travel. It will be recalled that the deceleration of the tool changer is effected by the actuation of a switch 238. The actuated switch 238 operates to effect the deenergization of the solenoid coil 350 associated with the valve plunger 337 of the valve 335. With the solenoid coil 350 deenergized, the valve plunger 337 is returned to its central neutral position shown in FIG. 22. Thus, the fluid supply to the left end of the cylinder 131 is interrupted and the movement of the tool change mechanism 70 is now merely by its own momentum. However, the momentum of the tool change mechanism 70 in a rightward direction is not sufficient to move it the full length of its path of travel and therefore fluid must continue to be supplied to the left end of the cylinder 131 to effect positive rightward movement of the tool change mechanism 70, but at a relatively slow rate of travel. The supply of fluid to the left end of the cylinder 131 for effecting rightward movement of the tool change mechanism 70 at a reduced rate is under the control of a valve 355. The valve 355 when operated, will direct a supply of fluid to the left end of the cylinder 131, but this supply of fluid through the valve 355 is greatly reduced with respect to the flow of fluid that is obtainable through the valve 335. The valve 355 may be operated by energizing a solenoid coil 356 which operates to effect the downward movement of the valve plunger 357 so as to connect the fluid supply line 344 to a line 358. Thus, with the solenoid coil 356 energized, fluid from the line 344 is directed through the valve, but the flow through the valve is greatly reduced so that the fluid supplied to the line 358 and thence to the left end of the cylinder 131 via the connecting line 346 will cause the piston 132 to move rightwardly but at a greatly reduced rate.

The operation of the fluid actuator 145 for moving the tool change arm 75 "out" away from the column or to retract the tool change arm "in" toward the column is under the control of a pair of directional valves 361 and 362. Both of these valves are normally positioned to connect both sides of the actuator 145 to the return line 265. The valve 361 may be actuated by energizing a solenoid coil 363 which will serve to connect the lower end of the cylinder 146 to the pressure line 323. When the valve 361 is actuated, exhaust pressure from the upper end of the cylinder 146 will flow through a line 364 and will flow through the valve 362 via a passage 365 formed in the valve plunger 366 to the return line 265.

On the other hand, if it is desired to move the tool change arm 75 "out" away from the column 41, the solenoid coil 363 associated with the valve 361 is deenergized thereby allowing the plunger 367 of the valve to be spring returned to its normal position. Simultaneously, a solenoid coil 368 associated with the valve 362 is energized thereby effecting upward movement of the valve plunger 366 so as to connect the upper end of the cylinder 146 with the fluid pressure supply line 323. The fluid pressure from the line 323 will flow through the valve via a connecting passage way 369 and through the line 364 to the upper end of the cylinder 146 to effect downward movement of the piston 147 which operates to move the tool change arm 75 outwardly. As the piston 147 moves downwardly, the exhaust pressure in the lower end of the cylinder 146 will flow into the connecting line 370 and through the valve 361 via a now aligned passage 371 into the return line 265 to return to the reservoir 261.

Rotation of the tool change arm 75 is effected by operation of the fluid actuator 160 which is under the control of a pair of directional valves 375 and 376 that normally connect both ends of the cylinder 161 to the return line 265. The valve 375 may be actuated by energizing a solenoid coil 377 while the valve 376 may be actuated by energizing a solenoid coil 378. With the solenoid coil 377 of the valve 375 energized, the valve will be operated so that a plunger 379 is moved upwardly within the valve housing and operates to direct fluid pressure from the pressure line 323 through the valve and into a line 380. Fluid from the line 380 will flow into a line 381 and through a check valve 382 and by mean of lines 383 and 384 will flow into the lower end of the cylinder 161. Fluid pressure supplied to the lower end of the cylinder 161 will effect the upward movement of the piston 163 in the cylinder 161 to the position shown in FIG. 22. With the piston 163 in an uppermost position, the tool change arm 75 will be in its 0° or initial position depicted in FIG. 7. The exhaust fluid from the upper end of the cylinder 161 will flow through a line 385 and will bypass a check valve 386 to flow through a throttle valve 387 that is set to establish a desired rate of rotation of the tool change arm 75. From the throttle valve 387, the exhaust fluid flows through a line 388 and through the valve 376 into the return line 265, the valve 376 being in its normal position shown in FIG. 22.

On the other hand, when it is desired to rotate the tool change arm 75 from its initial or 0° position to a position which is 180° displaced from that which the tool change arm occupies in FIG. 7 into the position depicted in FIG. 15, the solenoid coil 378 of the valve 376 will be energized to effect the operation of the valve. This will move the plunger 391 of the valve to connect the upper end of the cylinder 161 to the fluid supply line 323. Fluid from the line 323 will be directed by means of a passageway 392 into the line 388 and the flow of fluid will bypass the throttle valve 387 and flow through a check valve 386 and into the line 385 and thence to the upper end of the cylinder 161. The supply of fluid to the upper end of the cylinder 161 will cause the piston 163 to be moved downwardly within the cylinder for effecting the counterclockwise rotation of the tool change arm 75 so that it is rotated from the 0° or initial position to the 180° position shown in FIG. 15. The exhaust fluid from the lower end of the cylinder 161 will flow into the line 384 and through a throttle valve 393 that is set to establish a desired rate of counterclockwise rotation of the arm 75. From the throttle valve 393, exhaust fluid will flow through the line 380 and through the valve 375 to the return line 265, the valve 375 being in its normal position at this time.

As previously mentioned, the grips 77 and 78 are individually actuatable into clamped or released positions and are operated by the hydraulic actuators 181 and 182 respectively. The actuator 181 is under the control of a pair of directional valves 401 and 402 which normally connect both ends of the actuator cylinder 201 to the return line 265. With a solenoid coil 403 energized, a plunger 404 of the valve 401 is moved upwardly to the position shown in FIG. 22. The valve 401 is now operable to direct the fluid from the line 323 into a line 405 which is connected to the right end of the cylinder 201. Fluid flowing to the right end of the cylinder 201 will effect leftward movement of the piston 202. With the piston 202 positioned at the left end of the cylinder 201, it will operate to pivot the movable finger 77B into an open position so that the grip 77 is released. As the piston 202 is moved leftwardly, the exhaust fluid from the left end of the cylinder 201 will flow into a line 406 and through the directional valve 402 to the return line 265, the valve 402 being in its normal position at this time. If it is desired to effect a clamping operation of the grip 77, the solenoid coil 403 will be deenergized so that the valve plunger 404 is returned to its normal position. Simultaneously, a solenoid coil 407 associated with the valve 402 is energized and it will operate to move a plunger 408 upwardly within the valve housing. With the valve operated as described, fluid from the line 323 will flow through the valve 402 into the line 406 and is directed into the left end of the cylinder 201. The fluid will effect the movement of the piston 202 in a rightward direction, causing it to operate to pivot the movable finger 77B to a closed or clamped position. The exhaust fluid will flow out of the right end of the cylinder 201 and will flow to the return line 265 via the line 405 and the valve 401.

A similar arrangement is provided for the actuator 182 associated with the grip 78. The fluid actuator 182 is under the control of a pair of directional valves 410 and 411 which normally connect both ends of the actuator cylinder 196 to the return line 265. Energization of a solenoid coil 412 will operate the valve 410 so that fluid from the line 323 is directed into a line 413 and thence into the left end of the cylinder 196. Fluid supplied to the left end of the cylinder 196 will cause the piston 197 to move rightwardly into the position shown in FIG. 22. The rightward movement of the piston 197 will operate to effect pivotal movement of the movable finger 78B to a released position. The exaust fluid from the right end of the cylinder 196 will flow into a line 414 and through the valve 411 to the return line 265, the valve 411 being in its normal position. To effect a clamping operation of the finger 78B, the solenoid coil 412 will be deenergized so that the valve 410 returns to its normal position. Simultaneously, a solenoid coil 415, associated with the valve 411, is energized to operate the valve to direct fluid pressure to the right end of the cylinder 196. This will effect leftward movement of the piston 197 which thereupon operates to effect pivotal movement of the finger 78B into a closed or clamped position. At this time, exhaust fluid from the left end of the cylinder 196 will flow through the line 413 and the valve 410 into the return line 265, the valve 410 being in its normal position.

ELECTRICAL CIRCUIT

The electrical control system for controlling the operation of the machine is shown in the wiring diagrams illustrated in FIGS. 23, 24 and 25. In these diagrams, the electrical components are illustrated as being connected across a pair of energized power lines 425 and 426. Each of the electrical components is shown in the wiring diagram as connected across the power lines in one of the plurality of conductors or lines that are connected across the power lines with each of these lines being identified successively by the numerals 1 to 141, inclusive, so that components may be readily located in the diagrams. The contacts of the various relays and switches are identified by the same reference numerals as their associated relay coils but with a numeral suffix added for the purpose of distinguishing each individual contact from the others.

The machine is assumed to be operated automatically from recorded data contained on record, such as magnetic or punched tape 450. The record is read by a tape reader 451 contained in a cabinet or control panel 452 which is located on a bridge 453 that is arranged to span the bed 40, as depicted in FIG. 1.

The electrical control circuit for controlling the operation of the tool change mechanism of the machine in a tool change cycle of operation also includes the electrical control circuit for controlling the rotation of the storage magazine to complete a tool search for locating the desired tool at the ready station. The description of the electrical control circuits will be given with the machine components in an assumed initial condition. Thus, it will be assumed that the reading head 95 is forward and that the associated limit switch 101 is actuated. The carrier 76 is assumed to be positioned to locate tool change arm 75 in the parked position wherein the limit switch 234 is actuated. The tool grips 77 and 78 of the arm 75 are both assumed to be unclamped. Therefore, the limit switch 206 associated with the grip 77 is actuated in a clockwise direction and the limit switch 207 associated with the grip 78 is also actuated in a clockwise direction. The tool change arm 75, located in the parked position, is also assumed to be in a retracted position actuating the limit switch 251 in a counterclockwise direction. The tool change arm 75 is further assumed to be in its 0° or initial position wherein the grip 77 extends leftwardly, while the grip 78 extends rightwardly, as depicted in FIG. 1. Under this condition, the limit switch 171 will be actuated to a closed position. The collet 61 that is associated with the spindle 55 is assumed to be clamped and the associated limit switches 286 and 287 are actuated.

With the reading head 95 in forward or advanced position, the valve 318, shown in FIG. 22, will have been operated, and therefore, the solenoid 321, associated with the valve, is energized. Since both of the tool grips 77 and 78 are assumed to be unclamped, the valves 401 and 410 must be operated, and such operation is effected by the energization of the solenoids 403 and 412 respectively. It will be recalled that when the tool change arm 75 is in retracted position, the valve 361 is operated by the energization of the solenoid 363. With the tool change arm 75 in its initial or 0° position, the solenoid 377, associated with the valve 375 is energized so that the valve is operated to direct fluid pressure to the proper end of the actuator 160. Finally, since the collet 61 is clamped, the solenoid 281 associated with the valve 280 is energized to effect the operation of the valve for accomplishing the clamping of the collet. Under these conditions, the coil of a reading head forward relay 455, shown in line 24 of FIG. 23, is energized. With the coil of the relay 455 energized, the relay will operate to move its contact 455–1, in line 15, to closed position. As previously mentioned, the limit switch 101 is actuated and its associated contact 101–1, shown in line 33, is in closed position and operates to complete a circuit along line 33 for energizing the coil of a limit switch relay 456. The energized relay 456 operates to move its associated normally open contact 456–1, shown in line 15, to a closed position. Line 15 of FIG. 23 is now conditioned so that upon a proper signal from tape, the rotation of the tool drum or ring 89 in a tool selection operation may be effected. Upon a proper signal from the tape, an automatic tape contact 457, shown in line 15 of FIG. 23, is moved to a closed position to complete a circuit along lines 15, 16 and 17 for energizing the coil of a tool ring clockwise rotation relay 458. The energized relay will operate to move its normally closed contact 458–1, in line 20, to an open position to insure that the counterclockwise tool ring rotation relay 464 cannot be energized. Simultaneously therewith, the relay 458 also operates to move an associated normally open contact 458–2, line 35, to a closed position, thereby completing a circuit along line 35 for energizing the solenoid 292 that is associated with the directional valve 290 previously described. With the solenoid 292 energized, the valve 290, shown in FIG. 22, will be actuated to direct fluid pressure into line 296 for effecting the rotation of the magazine motor 90 in a direction to advance the magazine ring 89. Simultaneously therewith, the fluid pressure will be directed into the line 303 so that the rocker arm actuator 114 is operated to lift the rocker arm thereby releasing the limit switch 112. When the reading head 95 has been operated to identify and select a desired tool, a coil of a coincidence circuit relay 460 will be energized. The coil of the coincidence circuit relay 460 is shown in broken lines between lines 8 and 9 of FIG. 23, since this particular relay is part of an incident tool selection circuit [not shown]. With the coincidence relay 460 energized, it will operate to move its normally closed contact 460–1, in line 17, to open position. This will effect deenergization of the coil of the relay 458 which, in turn, operates to move its associated contact 458–2, in line 35, to an open position thereby deenergizing the solenoid 292 of the valve 290. The relay 460 also operates to move a normally open contact 460–2, in line 1, to a closed position thereby establishing a circuit along line 1 to energize the coil of an initial tool selection relay 461. The energized relay 461 operates to move an associated contact 461–1 to a closed position thereby establishing a holding circuit for maintaining the coil of the relay 461 energized. The holding circuit is established along line 2 through a normally closed contact 462–1 to line 3. The holding circuit continues along line 3 through the now closed contact 461–1 and back to line 1 and thence to the coil of the relay 461.

It will be recalled that the magazine ring overruns the tool ready position and the ring must be rotated in the opposite direction at a creep rate to accurately locate the selected tool at the tool ready station. This is accomplished through the operation of the energized relay 461 which moved a pair of contacts 461–2 and 461–3 in lines 9 and 18 respectively, to closed position and, simultaneously therewith, moved a normally closed contact 461–4, line 15, to open position. With the contact 461–3, in line 18, in a closed position, a circuit is established along line 15 through the now closed automatic tape contact 457 and through the now closed contacts 455–1 and 456–1 to a vertical line 463 and thence through the now closed contact 461–3 in line 18. The circuit continues from the contact 461–3 along line 19 to line 20 and through a normally closed contact 462–2 of a deenergized relay 462 and thence through the now closed contact 458–1 to the coil of a tool ring counterclockwise rotation relay 464. With the coil of the relay 464 energized, the relay operates to move a normally closed contact 464–1, shown in line 15, to open position so that the relay 458 cannot be operated, thereby insuring that the tool ring 89 will not be inadvertently rotated. The relay 464 also operates to move a normally open time-to-close contact 464–2, shown in line 36, to a closed position, thereby completing a circuit for energizing the solenoid 306 associated with the valve 290 shown in FIG. 22. With the solenoid 306 energized, the valve is operated to direct fluid pressure to the line 302 for effecting the operation of the motor 90 in a reverse direction and at a creep rate. With the valve 290 operated as described, the fluid pressure to the actuator 114 is discontinued and a spring 117 within the cylinder 113 operates to effect downward movement of the piston 115 to effect the pivotal movement of the rocker arm 104 so that the cam follower 106, carried by the rocker arm, engages the periphery 107 of the cam 108. When the selected tool has been moved back into the tool ready position, the cam follower 106, riding on the peripheral surface 107 of the cam 108, will enter the notch 109 thereby permitting the arm 104 to move downwardly to actuate the limit switch 112. With the limit switch 112 actuated, its associated contact 112–1, shown in line 10, is moved to a closed position to complete a circuit to the coil of the relay 462 to energize it. With the coil of the relay 462 energized, the relay operates to move an associated normally open contact 462–3, shown in line 9, to closed position. Since the relay 461 is presently energized, its associated contact 461–2, in line 9, is also in a closed position, therefore a circuit is now completed along line 9 to line 7 and thence to the closed contact 460–3 of the coincidence circuit relay 460 to line 5. From the contact 460–3, the circuit continues along a vertical line 465 to line 4 and thence through the coil of the relay 466, with the circuit being completed along line 4 to the energized line 426. The energized relay 466 operates to move a normally open contact 466–1 in line 7 to a closed position, thereby establishing a holding circuit from the energized vertical line 467 along line 8 and thence through the now closed contact 466–1 to line 465 and thence to the coil of the relay 460 for maintaining the relay energized. With the tool magazine in position, the limit switch 112 will be actuated and the relay 462 will be energized and will operate to move its normally closed contact 462–2, line 20, to open position. The relay 464 is thereby deenergized and operates to move its associated contact 464–2, in line 36, to an open position which results in the deenergization of the solenoid 306. With the solenoid 306 associated with the valve 290 deenergized, the valve is immediately returned to its central neutral position depicted in FIG. 22, to terminate the operation of the motor 90 locating the selected tool accurately in the tool ready position.

The desired tool having been located at the ready position or station, the reading head 95 must be retracted. This is effected by deenergizing the solenoid 321 associated with the valve 318 and energizing the solenoid 326 associated with the valve 319. This is accomplished through the operation of the reading head retract relay 468, the coil of which appears in line 28. The relay 468 is energized through a circuit established along line 25 through the now closed contact 466–4 of the energized relay 466, the normally closed contact 492–1 to line 26. The circuit continues from line 26 to line 28 and thence through the coil of the reading head retract relay 468 to energize the relay. With the coil of the relay 468 energized, the relay operates to move an associated normally closed contact 468–1, in line 36, to an open position thereby interrupting a holding circuit along line 36, which operated to maintain the solenoid 321 energized. It will be recalled that the reading head forward relay 455 had been previously deenergized. Therefore, its associated normally open contact 455–2, in line 37, is returned to its normally open position. Thus, the circuit initially established along line 37 for initially energizing the solenoid 321 is interrupted and when the contact 468–1, in line 36, moves to an open position, the maintaining circuit is interrupted to deenergize the relay. Simultaneously, with the opening of the contact 468–1, in line 36, a normally open contact 468–2, in line 38, is moved to closed position, so that a circuit along line 38 is completed to energize the solenoid 326. This will effect the retraction of the reading head 95 to move the fingers 96 out of engagement with the tool located at the ready station. As the reading head 95 retracts, the limit switch 101 is released so that its contact 101–1, in line 33, moves to an open position to effect the deenergization of the coil of the relay 456. With the reading head 95 in full retracted position, the limit switch 102 is actuated and its associated contact 102–1, in line 34, is moved to closed position, thereby completing a circuit along line 34 for energizing the coil of the relay 473. Upon this occurrence, an associated normally open contact 473–1, in line 39, is moved to a closed position, and since the coil of the relay 455 is now deenergized, its associated contact 455–3, in line 39, is also in closed position, so that a circuit for maintaining the solenoid 326 energized is completed from line 38 via line 39 to the solenoid.

With the reading head 95 retracted, the coincidence circuit relay 460, the coil of which is shown in broken lines and appears between lines 8 and 9 of FIG. 23, will be deenergized thereby effecting the movement of its associated contacts 460–2 and 460–3, in lines 1 and 6 respectively, to their normally open positions. However, at this time, a normally open contact 468–4, in line 3, is closed because of the prior operation of its associated relay 468. Therefore, at this time, the relay 461 is maintained energized through a holding circuit completed along line 3, through the now closed contact 468–3, the closed contact 466–3 of the energized relay 466, and through the closed relay maintaining contact 461–1 and the connecting line 474 to line 1. With the relay 461 maintained energized it, in turn, operates to maintain the relay 466 energized so that a normally open contact 466–2, in line 70 of FIG. 24, is maintained in closed position. The contact 466–2 must be maintained in its closed position for the subsequent operation of the tool grip 77 into clamped position, which will subsequently be described.

With the reading head 95 retracted, the carrier 76 may be moved leftwardly, as viewed in FIG. 1, to engage the grip 77 of the arm 75 with the selected tool at the ready station. The arm, therefore, will be moved from the position shown in FIG. 7, to the position depicted in FIG. 8. To effect the leftward movement of the carrier 76, for moving the tool change arm grip 77 into engagement with the tool located at the ready station, the solenoid 336 associated with the directional valve 335, must be energized to operate the valve for directing fluid pressure to the right end of the cylinder 131, shown in FIG. 22. It will be recalled, that as an initial condition, the tool grip 77 was unclamped and that the associated limit switch 206 was actuated in a clockwise direction. Under these conditions, the contact 206–1 of the limit switch 206, line 136 of FIG. 25, will be in a closed position thereby completing a circuit along line 136 to energize the coil of a relay 477. With the coil of the relay 477 energized, its associated contact 477–1, in line 53 of FIG. 24, will be moved to a closed position. It will also be recalled, that the tool change arm 75 is located in the retracted position, and the limit switch 251 is actuated in a counterclockwise direction, so that its contact 251–1, in line 129 of FIG. 25, is in a closed position thereby completing a circuit along line 129 to energize the coil of a relay 478. With the coil of the relay 478 energized, the relay will operate to move its associated contact 478–1, in line 55, to a closed position. In like manner, a contact 479–1, in line 55, will also be in a closed position because the coil of the relay 479, which appears in line 130, is presently energized through a circuit previously completed when the limit switch 171 was actuated. Thus, with the relays 468 and 473 operated, their associated contacts 468–3, in line 53, and 473–2, in line 55, will be moved to closed positions and a circuit is established from the energized line 425 along line 53 through the now closed contacts 468–3, 477–1 and thence along line 54 to line 55. The circuit continues along line 55 through the now closed contacts 473–2, 478–1 and 479–1 to the coil of the carrier left relay 480. With the coil of the relay 480 energized, it will operate to move an associated normally open contact 480–1, in line 111 of FIG. 25, to a closed position to energize the solenoid 336. This will operate the valve 335 to direct fluid pressure to the right end of the cylinder 131 to effect leftward movement of the carrier 76 to position the tool change arm 75 into a position wherein its associated grip 77 is in engagement with a tool located at the ready station as depicted in FIG. 8. With the carriage moved into a leftward position, the limit switch 226 will be actuated so that its associated contact 226–1, in line 139 of FIG. 25, is moved to a closed position for completing a circuit along line 139 to the coil of a relay 481. The relay 481, upon being energized, will operate to move its associated contact 481–1, in line 112, to a closed position, thereby completing a holding circuit around the contact 480–1, shown in line 111, for maintaining the solenoid 336 of the valve 335 energized upon the subsequent deenergization of the relay 480.

With the tool grip 77 now engaged with a tool at the ready station, the grip must be clamped. This is initiated through a circuit established along line 66 of FIG. 24, through the normally closed contact 482–1 and the now closed normally open time-to-close contact 481–2 of the relay 481. The contact 481–2 will move to a closed position upon energization of the coil of the relay 481 after a time delay which is sufficient to insure that the carrier 76 is in its full leftward position wherein the grip 77 is in firm engagement with the tool at the ready station. The circuit continues from the now closed contact 481–2 to energize the coil of a relay 483. With the coil of the relay 483 energized, the relay will operate to move an associated normally open contact 483–1, in line 72, to a closed position. Since the relays 479, 466 and 473 are energized at this time, associated contacts 479–2 and 466–2, in line 70, and 473–3, in line 72, will be in closed positions. Thus, a circuit from the energized line 425 is established along line 70 through the now closed contacts 479–2 and 466–2 to line 71 and thence to line 72 and through the now closed contacts 473–2 and 483–1 to line 73 and thence to line 74 and through the coil of a tool grip 77 clamp relay 486. The energized relay 483 also operates to move another associated normally closed contact 483–2, in line 81 of FIG. 24, to an open position to insure that a tool grip relay 487, which is associated with the grip 78, cannot be energized at this time. With the relay 486 energized, it will operate to move a normally open contact 486–1 to closed position to establish a holding circuit to maintain the coil of the relay energized. The holding circuit is completed from the energized line 425 along line 69 through the normally closed contact 491–1 of a deenergized carrier right relay 491 to line 70 and thence to line 75 and along line 75 through the now closed contact 486–1 to line 73 and thence along line 73 to line 74 and through the coil of the relay 486.

The energized relay 486 also operates to move an associated normally closed contact 486–2, in line 118, to open position, to deenergize the solenoid 403 associated with the valve 401. Also, a normally open contact 486–3 of the relay in line 117 is moved to closed position to establish a circuit along line 117 to energize the solenoid 407 associated with the valve 402. The valve 401 will now be operated to connect the right end of the actuator 181 associated with the grip 77 to the return line 265, while the valve 402 will be operated to direct fluid pressure to the left end of the actuator 181 thereby operating the finger 77B into tool gripping position.

With the tool grip 77 actuated into clamped position, the limit switch 206 will be actuated in a counterclockwise direction, as viewed in FIG. 22, so that its associated contact 206–1, in line 136 of FIG. 25, is moved to open position thereby deenergizing the coil of the relay 477. The deenergized relay 477 operates to move its contact 477–3, in line 30, to its normally closed position. Thus, a holding circuit is established for maintaining the coil of the relay 468 energized.

The limit switch 206, upon being actuated in a counterclockwise direction, will also move its associated contact 206–2, in line 135, to a closed position thereby establishing a circuit along line 135 to energize the coil of the relay 502. With the coil of the relay 502 energized, the relay will operate to actuate its associated contacts 502–1, 502–2, 502–3 and 502–4 in lines 106, 61, 41 and 13, respectively, for subsequent utilization.

With the tool grip 77 operated into clamped engagement with the tool presented by the magazine, the tool change arm 75 will be moved outwardly to withdraw the tool from the magazine. It will be recalled, that as an initial condition, the tool change arm 75 was in a retracted position, therefore the coil of the tool change arm "in" relay 493, in line 94, is presently energized. The coil of the "in" relay was initially energized through a circuit established from line 92 via connected vertical line 494 and line 95 through a normally closed contact 495–1 and a normally closed contact 492–2 of deenergized relay 492 and a now closed contact 496–1 of a tool carriage parked relay to a vertical line 497 and thence to line 94 to the coil of the relay 493. With the relay 493 energized, the relay operates to move its normally open contact 493–1, in line 97, to a closed position to establish a holding circuit along line 97 for maintaining the relay energized. This circuit along line 97 is completed through the normally closed contact 498–1 of deenergized relay 498, the normally closed contact 499–1 of the deenergized tool arm "out" relay 499, and through the now closed normally open contact 493–1 along the connecting line 497 and thence to the horizontal line 94 and through the coil of relay 493 to maintain this coil energized. However, to effect the outward movement of the tool change arm 75, the relay 499 must be energized and this is accomplished by means of a circuit that is established from the energized line 425 along line 106 and thence through a now closed time-to-close contact 502–1, through a now closed contact 486–5 of the energized tool grip 77 clamp relay and thence through the now closed contact 483–3 of the relay 483. The circuit continues along line 106 to line 105 and thence by means of a vertical line 503 to line 100 and through the coil of the relay 499 to energize the relay. With the relay 499 energized, the relay operates to move its normally closed contact 499–1, in line 97, to an open position thereby interrupting the holding circuit to the coil of the tool arm "in" relay 493 to deenergize the relay. Simultaneously, the relay 499 also moves its normally open contact 499–2, in line 98, to closed position and with the relay 493 deenergized, the contact 493–2, in line 98, is also in closed position, so that a holding circuit is established along line 98 to line 99 and thence to line 100 to maintain the coil of the relay 499 energized.

Upon deenergization of the relay 493, the relay also operates to move its contact 493–3, in line 125, to open position thereby effectually preventing any circuit from being established along line 125 to the solenoid 363. The deenergized relay 493 also operates to move its contact 493–4, in line 128, to its normally closed position to partially condition line 128 for subsequent use as a maintaining circuit. On the other hand, the energized relay 499 moves its associated contact 499–3, in line 126, to open position thereby interrupting the circuit along line 126 to deenergize the solenoid 363. With the solenoid 363 deenergized, the valve 361, with which the solenoid is associated, is operated to return to its normal position whereby it connects the lower end of the cylinder 146 to the exhaust line 265. Simultaneously, with the movement of the contact 499–3 to open position, another contact 499–4, in line 127, is moved to a closed position to establish a circuit along line 127 to the solenoid 368 for energizing the solenoid. Energization of the solenoid 368 will effect the operation of the valve 362 to direct fluid pressure to the top end of the cylinder 144, in FIG. 22, to effect the outward movement of the tool change arm 75.

With the tool change arm 75 in the "out" position, FIG. 9, the tool 60A, engaged by the grip 77, will be extracted from the magazine and the limit switch 251 will be actuated in a clockwise direction. With the limit switch 251 actuated in a clockwise direction, its contact 251–2, in line 132 of FIG. 25, will be moved to a closed position to establish a circuit along line 132 for energizing the coil of the relay 506. Also, a contact 251–1, line 129, will be moved to open position thereby effecting the deenergization of the coil of the relay 478. The deenergized relay 478 operates to move its associated contact 478–1, in line 55 of FIG. 24, to open position thereby interrupting the circuit along line 55, which had been previously established, for energizing the coil of the tool carrier left relay 480. The now deenergized relay 480 will operate to move its associated contact 480–1, in line 111 of FIG. 25, to open position thereby deenergizing the solenoid 336 associated with the valve 335 so that the valve is returned to its central neutral position. Simultaneously therewith, the relay 480 also operates to move its normally closed contact 480–2, in line 115, to its closed position. However, with the solenoid 506 energized, the contact 506–1, in line 61 of FIG. 24, is in a closed position so that a circuit is now established for energizing the coil of the tool carrier right relay 482, in line 65. The circuit is established from the energized vertical line 425, in FIG. 24, along line 58 and through the now closed contact 469–4 to a connected vertical line 507 and thence to line 61 via line 60 and through the now closed contacts 498–2, 506–1 and 502–2, to line 63 and thence to line 65, with the circuit continuing on through the now closed contact 479–4 to the coil of the relay 482 for energizing this relay. With the coil of the relay 482 energized, the relay operates to move its associated contact 482–2, in line 66, to open position thereby interrupting the circuit along this line to deenergize the coil of the relay 483. The deenergized relay 482 also operates to move its associated contact 482–1, in line 112, to open position so that a circuit to the solenoid 336 of the valve 335 cannot be established. Simultaneously therewith, the relay 482 operates to move its normally open contact 482–3, in line 114 of FIG. 25, to a closed position thereby establishing a circuit along line 114 through the now closed contact 482–3 to the contact 238–1 of the limit switch 238. The circuit continues from the contact 238–1 of the deceleration limit switch 238 to line 115 and along a vertical line 508 to line 109 and thence to the solenoid 350 of the valve 335. With the solenoid 350 of the valve 335 energized, the valve will operate to direct fluid pressure to the left end of the cylinder 131 of the actuator 130 for effecting the rightward movement of the carrier from the position in FIG. 9, into the parked position shown in FIG. 10. With the carrier 76 in the parked position, the limit switch 234 will be actuated to move its associated contact 234–1, in line 131 of FIG. 25, to a closed position to effect the energization of the relay 498. The energized relay 498 will operate to move its normally closed contact 498–2, in line 61 of FIG. 24, to an open position thereby interrupting the circuit to the carrier right relay 482.

With the relay 498 energized and with the relay 482 deenergized, a circuit will be completed from the energized line 425 along line 67 through the now closed contact 498–3 and the normally closed contact 480–3 and the now closed contact 482–2, to the coil of the carrier parked relay 496 to energize this relay.

With the relay 496 energized, it will operate to move its normally open contact 496–1, in line 95, to a closed position to complete a circuit from the energized line 92 along the vertical line 494 and line 95 through closed contacts 495–1, 492–2 and 496–1 to the vertical line 497 and thence back to line 94 and through the coil of the relay 493. The energized tool arm "in" relay 493 will operate to move an associated normally open contact 493–1, in line 97, to closed position and simultaneously therewith, move a normally closed contact 493–2, in line 98, to an open position. This will interrupt the holding circuit that had been established along line 98 for maintaining the coil of the relay 499 energized and which operated to effect the outward movement of the tool change arm, as previously described. The deenergized relay 499 will now operate to move its associated contact 499–2, in line 98, to open position, and at the same time, move its contact 499–1, in line 97, to closed position. This will complete a circuit along line 97 for maintaining the coil of the relay 493 energized.

With the tool arm "in" relay 493 energized, it will operate to move its associated contact 493–4, in line 128, to an open position thereby interrupting the maintaining circuit to the solenoid 368 to deenergize it. The valve 362 will now operate to connect the upper end of the cylinder 146, shown in FIG. 22, to the return line 265. At the same time, the relay 493 operates to move a normally open contact 493–3, in line 125, to closed position thereby completing a circuit along line 125 for energizing the solenoid 363 associated with the valve 361 so that the valve is operated to direct fluid pressure to the lower end of the cylinder 146 to effect the inward movement of the tool change arm 75. The tool arm 75 carrying the tool 60A is now located in the position depicted in FIG. 11, ready to effect a tool interchange.

With the tool change arm 75 in full retracted position, the limit switch 251 is actuated in a counterclockwise direction. This action will move its associated contact 251–2, in line 132, to an open position thereby interrupting the circuit to the coil of the relay 506 to effect a deenergization of the relay. Thereupon, a contact 506–2, in line 128, is moved to an open position and the circuit utilized for maintaining the solenoid 368 energized upon the prior operation of the valve 362, is now effectively interrupted. Simultaneously, the relay 506 also operates to move an associated contact 506–1, in line 61 of FIG. 24, to an open position thereby interrupting the circuit to the tool carrier right relay 482 to maintain this relay deenergized.

With the limit switch 251 actuated in a counterclockwise direction, its associated contact 251–1, in line 129 of FIG. 25, is moved to a closed position thereby effecting the energization of the coil of the relay 478. The relay 478 will operate so that an associated normally open time-to-close contact 478–2, in line 13 of FIG. 23, moves to a closed position upon a suitable time delay which is set to insure that the arm 75 is in full retracted position. Upon the movement of the time-to-close contact 478–2, in line 13, to closed position, a circuit is completed from the energized line 425 along line 13 and through the now closed contacts 473–4, 478–2, 479–5, 469–6, 502–4 and 496–2, to a vertical line 509. The circuit continues to line 12 and line 11 and through the now closed contacts 462–4, 466–5, to the coil of the relay 492, to energize the relay. The energization of the relay 492 indicates in the electrical control system that a tool selection has been completed and that the tool has been removed from the magazine, and is held in readiness for transfer to the spindle. With the energization of the relay 492, the tool selection operation has been completed and the actual tool changing operation may now be started.

With the tool change arm in parked position holding the tool 60A, the limit switch 234 is actuated and will effect the energization of the relay 498, as previously mentioned. The energized relay 498 will, in turn, effect the energization of the relay 496. The relay 496 will operate to move its associated contact 496–3, in line 50, to closed position to thereby establish a circuit along line 50 through the now closed contact 496–3 to a vertical line 512, and thence to line 47 and to the coil of a machining start indicating relay 514. The energized relay 514 operates to move an associated contact 514–1, in line 27 of FIG. 23, to a closed position. This would normally complete a circuit along this line to effect the operation of the tape reader 451 for producing signals from the tape to effect the control movement of the column 41, the spindle head 50, and the saddle 64, for advancing the tool 60 carried by the spindle 55 and the workpiece W relative to each other in a machining operation. However, at this time, a signal from tape causes a voltage to be applied to line 40 of FIG. 24, so that the coil of the relay 511 is energized. The relay 511, upon being energized, operates to indicate in the electrical control circuit that a tool transfer command has been received and that a tool transfer is about to be effected. With the relay 511 energized, it operates to move a normally closed contact 511–4, in line 27, to an open position thereby effectively interrupting the circuit along line 27 for maintaining the tape reader 451 inoperative to transmit any further signals from the tape. A holding circuit for maintaining the coil of the relay 511 energized is also established via line 43, in FIG. 24, through the now closed contact 511–1 to line 42 and thence to line 40 and through the normally closed contact 470–4 of the tool grip 78 clamped relay 470. The circuit continues from the closed contact 470–4 along line 40 to line 41 and thence along line 41 back to line 40 and thence to the coil of the relay 511 to maintain the relay energized upon the subsequent interruption of the voltage signal from the tape reader. Simultaneously, with the energization of the relay 511 from a signal from tape, the tape reader also transmits a signal to effect the operation of the spindle head motor 51 for moving the spindle head 50 along the Y axis into tool transfer position depicted in FIG. 12, wherein it is positioned in a horizontal plane directly in line with the tool grip 78 of the tool change arm 75. With the spindle head 50 moved to tool change position, a limit switch 515 is actuated by means of a dog 513 carried on the rear surface of the spindle head 50, shown in FIG. 2. With the limit switch 515 actuated, its associated contact 515–1 in line 52 will be moved to a closed position. Since the relay 492, which indicates that the tool selection is completed, has been energized, its associated contact 492–6 is in a closed position and a circuit will be completed along line 52 to energize a spindle head in tool transfer position relay 516. With the relay 516 energized, it will operate to move its associated normally open contact 516–1, in line 58, to a closed position thereby completing a circuit along line 58 through closed contacts 469–4, 516–1 and 511–2 to line 59 and thence to line 62. The circuit continues on through the now closed contact 478–3 and along line 62 back to line 61. The circuit continues through the now closed contact 502–2 to line 63 and thence to line 65 and through the now closed contact 479–4 to the coil of the relay 482 to energize the coil and operate the relay. The energized relay 482 operates to move its associated contact 482–1, in line 112, to an open position, and simultaneously therewith, move its normally open contact 482–3, in line 114, to a closed position. This action will effect the energization of the solenoid 350 to operate the valve 335 for directing fluid pressure to the left end of the cylinder 131 of the carrier actuator 130 to effect rightward movement of the carrier, moving the tool change arm from the parked position towards the spindle.

As the carrier 76 leaves the parked position, the limit switch 234 will be released so that its associated contact is moved to open position, as depicted in line 131 of FIG. 25. This action interrupts the energizing circuit to the coil of the relay 498 and the relay operates to move its associated contact 498–1, in line 97 of FIG. 25, to a closed position thereby completing a holding circuit along line 97 for maintaining the tool arm "in" relay 493 energized. The relay 498 also operates to move its contact 498–4, in line 32 of FIG. 23, back to its normally closed position for maintaining the relay 468 energized to insure that the reading head is maintained in retracted position.

The carriage 76 moves rightwardly towards the spindle at a rapid rate until it reaches a position wherein the grip 78 of the arm 75 is relatively close to the tool presented by the spindle 55, at which time the limit switch 238 is actuated by a dog 241. The actuated limit switch 238 will operate to move its associated contact 238–1, in line 114 of FIG. 24, out of engagement with a terminal 517 and into engagement with a terminal 518. This interrupts the circuit to the solenoid 350 associated with the valve 335 to deenergize the solenoid and operate the valve to block the flow of fluid pressure to the left end of the cylinder 131. However, the contact 238–1 is now in engagement with the terminal 518 and a circuit is completed via the terminal 518 to a solenoid 356 associated with the valve 355. This will effect the operation of the valve 355 to direct fluid to the left end of the actuator 130 but at a reduced volume so that the movement of the carrier 76 in a rightward direction will continue at a slow rate. When the carrier 76 is moved into its full rightward position, as limited by the bracket 122 and as depicted in FIG. 13, the tool grip 78 will engage on the collar of the tool 60B that is extending from the spindle 55. Thereupon the limit switch 246, in line 138 of FIG. 25, is actuated to a closed position and operates to complete a circuit for energizing the coil of the relay 510. Upon the energization of the relay 510, it will operate to move its contact 510–1, in line 41, to a closed position to establish a holding circuit for maintaining the coil of the relay 511 energized. The relay 510 also operates its time-to-close contact 510–4, in line 68, which after a predetermined set time delay, will close to complete a circuit along line 68 through contact 480–4, the now closed contact 510–4, to the coil of a relay 491 for energizing the coil. With the coil of the relay 491 energized, the relay will operate to move its normally closed contact 491–1, in line 69, to open position. This would normally operate to deenergize the relay 486 which would then operate to effect the release of the tool grip 77. However, at this time, the relay coil 486 is maintained energized through a circuit completed along line 75, through a normally closed contact 495–4 and a maintaining contact 486–1 to line 73 and thence to line 74 and to the coil of the relay 486.

The relay 491 also operates to move its associate normally open contact 491–3, in line 78, to a closed position. Upon this occurrence, a circuit is established for energizing the coil of the clamp relay 487 associated with the tool grip 78. This circuit is established from the energized line 425 along line 70 via vertical line 519 to line 78 and thence along line 78 through the now closed contacts 516–2, 511–3 and 491–2 to line 80 and by means of a vertical line 525 to line 81 and thence to the coil of the relay 487 to energize this relay. The energized relay 487 operates to move its associated contact 487–1, in line 83, to a closd position thereby establishing a holding circuit for maintaining the relay energized. The holding circuit is completed along line 83 through the contact 487–1 to line 82 and thence to line 81 and through the closed contact 483–2 to the coil of the relay. The energized relay 487 also operates to move its associated contact 487–2, in line 120, to open position thereby interrupting the circuit to the solenoid 412 associated with the valve 410 and simultaneously therewith, will move another contact 487–3, in line 119, to a closed position. With the contact 487–3 in closed position, a circuit is established along line 119 for energizing the solenoid 415 associated with the valve 411. Thus, the valve 410 is operated into its normal position wherein the left end of the actuator 182 is connected to exhaust while the valve 411 is operated to direct fluid pressure to the right end of the actuator thereby effecting a clamping of the grip 78.

With the tool grip 78 in clamped position, the limit switch 207 will be actuated in a counterclockwise direction thereby releasing its associated contact 207–2 to open position interrupting the circuit along line 134 to effect the deenergization of the coil of the relay 469. Simultaneously therewith, the contact 207–1 of the limit switch 207 is moved to closed position so that a circuit along line 133 is completed to energize the coil of the relay 470. The energized relay 470 will operate to move a contact 470–3, in line 107, to a closed position, such action occurring after a predetermined time delay to allow a sufficient time interval for effecting the positive clamping of the grip 78 with the tool presented by the spindle 55. When the predetermined time has elapsed, the contact 470–3, in line 107, will move to a closed position thereby completing a circuit for energizing the coil of the collet unclamped relay 520. This circuit is established from the energized line 425 along line 109, through the now closed contact 495–2 to line 108 and thence to line 107. The circuit continues through the time-to-close contact 470–3 and the now closed contact 510–3, through the coil of the relay and thence to the energized line 426. Upon energization of the coil of the relay 520, the relay will operate to move its associated normally closed contact 520–1, in line 112, to an open position, and simultaneously therewith, move a normally open contact 520–2, in line 116, to a closed position. This action effects the deenergization of the solenoid 282 associated with the valve 280, and simultaneously therewith, it will effect the energization of the solenoid 281. The valve 280 is now operable to direct fluid pressure to the right end of the cylinder 276 for effecting the release of the collet 61. When the collet 61 is moved to a released position, the limit switch 287 will be released to an open position, as depicted in line 140 of FIG. 25. The limit switch 286 is also operated in that the switch is actuated in the opposite direction by means of a dog 521, shown in FIG. 22. With the limit switch 286 now actuated by the dog 521, its associated contact 286–1, in line 140, is moved to open position, and simultaneously therewith, its other associated contact 286–2, in line 141, is moved to a closed position. Thus, an energizing circuit is established along line 141 for energizing the coil of the relay 522. With the relay 522 energized, the relay will operate to indicate in the electrical control system that the withdrawal of the previously used tool 60B from the spindle can now be accomplished. With the relay 522 operated, an associated contact 522–1, in line 104, is moved to a closed position and operates to complete a circuit for energizing the coil of the tool arm "out" relay 499. This circuit is established from the energized line 425 along the line 106 to a vertical line 523 and thence to line 104. The energizing circuit continues along line 104 through the now closed contacts 470–2, 491–4, 522–1 and 520–4, to line 103 and thence to the vertical line 503 and thence to the coil of the relay 499. The energized relay 499 operates to move its normally closed contact 499–1, in line 97, to an open position to thereby interrupt the circuit along the line 97 which circuit was utilized to energize the tool arm "in" relay 493. Therefore, the relay 493 now operates to move its associated contacts to their normal positions, as shown in FIGS. 24 and 25. Thus, the contact 499–2, in line 98, is in a closed position, and since the relay 493 is energized, its associated contact 493–2, in line 98, is also in a closed position thereby establishing a holding circuit along lines 98 and 100 to maintain the coil of the relay 499 energized.

The energized relay 499 also operates to move its associated contacts 499–3 and 499–4, in lines 126 and 127, respectively, to open and closed positions. With the contact 499–3, in line 126, moved to open position, a holding circuit along line 126, for maintaining the solenoid 363 of the valve 361 energized, is interrupted to effect the deenergization of the solenoid thereby effecting the operation of the valve into a position wherein the lower end of the cylinder 146 is connected to the return line 265, in FIG. 22. On the other hand, with the contact 499–4, in line 127, moved to closed position, a circuit will be completed along line 127 for energizing the solenoid 368 associated with the valve 362 so that the valve is operated to direct fluid to the upper end of the cylinder 146. With fluid being directed to the upper end of the cylinder 146, the actuator 145 will be energized for effecting the outward movement of the tool change arm 75 thereby extracting the tool 60B from the spindle 55, as depicted in FIG. 14. With the tool change arm 75 moved to full extended position, the limit switch 251 is actuated in a clockwise direction thereby moving its associated contact 251–1, in line 129, to open position. This will interrupt the circuit along line 129 to effect deenergization of the relay 478. With the relay 478 deenergized, it will operate to move its associated contacts 478–5 in line 76 and 478–6 in line 79 to closed positions, thereby establishing holding circuits to the coils of the grip clamp relays 486 and 487, respectively, to maintain these relays energized.

As previously mentioned, with the limit switch 251 actuated in a clockwise direction, its associated contact 251–2, in line 32, will be moved to a closed position to thereby establish an energizing circuit along line 152 for energizing the coil of the relay 506. With the relay 506 energized, it will operate to move its associated contacts 506–3 in line 57, 506–1 in line 61, 506–4 in line 88 and 506–2 in line 128, to closed positions. With the contact 506–4, in line 88, moved to closed position, a circuit is established along line 88 through the now closed contacts 506–4, 495–5 and 522–3, to a vertical line 524 and thence to the coil of a relay 527 via lines 89 and 90, and from the coil of the relay along line 90 to the energized line 426 for energizing the relay. With the relay 527 energized it will operate to move its associated contact 527–1, in line 86, to an open position thereby interrupting the circuit along this line to effect deenergization of a tool arm clockwise rotation relay 528, the coil of which appears in line 84. Simultaneously therewith, the relay 527 also operates to move its normally open contact 527–2, in line 87, to a closed position thereby establishing a circuit along line 87 through the now closed contacts 527–2, 528–2 and 531–1, to line 524 and thence via lines 88 and 90 to the coil of the relay 527 for maintaining the relay energized.

With the tool arm 75 in extended position, as depicted in FIG. 14, rotation of the arm in a counterclockwise direction, as indicated by the arrows in FIG. 14, from its 0° initial position to its 180° position, must be effected for interchanging the positions of the tools carried thereby. This step in the tool change cycle of operation is initiated by the energized relay 527 which operates to move its associated contact 527–3, in line 122, to an open position thereby effecting the deenergization of the solenoid 377 associated with the valve 375. The valve 375 will now operate to connect the lower end of the cylinder 161 to the exhaust line 265. Simultaneously therewith, the relay 527 is also operated to move a normally open contact 527–4, in line 123, to a closed position to thereby establish an energizing circuit along line 123 to the solenoid 348 associated with the valve 376. With the solenoid 348 energized, the valve 376 is operated to direct fluid pressure to the top end of the cylinder 161 so as to effect the downward movement of the piston 163 relative to the cylinder for pivoting the tool change arm 75 in a counterclockwise direction from a 0° initial position to a position which has herein been called the 180° position. Thus, the tool change arm 75 will be rotated in a counterclockwise direction, as indicated by the arrows in FIG. 14, so that the tool 60A, which has been extracted from the magazine 71 will be moved into axial alignment with the spindle 55 while the tool 60B that was removed from the spindle 55 and previously used in a machining operation will now be positioned and held in readiness for its subsequent insertion into the magazine 71.

With the tool arm 75 rotated from its initial 0° position to its 180° position, the limit switch 171 is deactuated so that its contact 171–1, in line 130 of FIG. 25, is moved to an open position thereby interrupting the circuit along line 130 to deenergize the coil of the relay 479. On the other hand, the limit switch 170 will be actuated so that its associated contact 170–1, in line 137, is moved to a closed position. With the contact 170–1 in closed position, a circuit along line 137 is established to energize the coil of the relay 495.

The new tool 60A is now positioned, in FIG. 15, for insertion into the spindle 55. To effect the insertion of the new tool 60A into the spindle 55, the arm 75 is moved rearwardly or retracted, and this is accomplished through the operation of the relay 495. With the relay 495 energized, it will operate to move a normally associated contact 495–6, in line 94, to a closed position and complete a circuit for energizing the coil of the tool arm "in" relay 493. This circuit is established along line 92 through now closed contacts 516–3, 491–3 and 522–2, to line 93, and thence to line 94 and through the now closed contact 495–6 to the coil of the relay 493 for energizing the coil. The energized relay 493 operates to move its associated contacts 493–1 and 493–2, in lines 97 and 98 respectively, to closed and open positions respectively. The movement of the contact 493–1 to closed position completes a holding circuit along line 97 for maintaining the coil of the relay 493 energized. On the other hand, with the contact 493–2, in line 98, moved to open position, a circuit for maintaining the coil of the tool arm "out" relay 499 is interrupted and this relay becomes deenergized. As the relay 493 operates to move its associated contacts 493–1 and 493–2 to actuated positions, it will also operate to move an associated contact 493–4, in line 128, to an open position so that the solenoid 368 associated with the valve 362 is deenergized and the valve is operated to connect the upper end of the cylinder 146 of the tool arm actuator 145 to the exhaust line 265. On the other hand, another contact 493–3, in line 125, is actuated to a closed position to complete a circuit along line 125 for energizing the solenoid 363 associated with the valve 361. With the solenoid 363 energized, the valve is operated to direct fluid pressure to the lower end of the cylinder 146 of the arm actuator 145. With these conditions obtained, the tool arm 75 is retracted so that the tool 60A is inserted into the spindle 55.

With the new tool inserted into the spindle 55, the collet 61 must be clamped to operatively secure the tool within the spindle. To this end, when the tool change arm 75 has been fully retracted, the limit switch 251 will be actuated in a counterclockwise direction moving its associated contact 251–2, in line 132, to an open position to interrupt the circuit to the coil of the relay 506 to deenergize this relay. On the other hand, the contact 251–1, associated with the switch 251, is moved to closed position thereby establishing a circuit along line 129 for energizing the coil of the relay 478. With the relay 478 energized, it will operate to move its associated contact 478–4, in line 107, to an open position and interrupt the circuit along line 107 to effect the deenergization of the coil of the collet unclamped relay 520. This will cause the relay 520 to operate to move its associated contact 520–3, in line 110, to closed position. When the contact 520–3 is moved to a closed position, a circuit will be completed along line 110 for energizing the coil of the collet clamp relay 531. With the collet clamp relay 531 energized, it will operate to move its associated contact 531–2, in line 115, to an open position, and simultaneously therewith, operate to move its normally open contact 531–3, in line 113, to a closed position. The holding circuit which maintained the solenoid 281 energized is now interrupted, and therefore, the solenoid is deenergized. On the other hand, with the contact 531–3, in line 113, moved to closed position, a circuit along line 113 is completed for energizing the solenoid 282 associated with the valve 280 so that the valve is operated to direct fluid pressure to the left end of the cylinder 276 for effecting the clamping of the collet 61.

With the new tool clamped in the spindle, the tool grip 77 may now be operated in a releasing action so that the tool arm 75 may be subsequently moved out of engagement with the tool. The operation of the tool grip 77 in a releasing action is accomplished by means of the limit switches 286 and 287, shown diagrammatically in FIG. 22, which are actuated when the collet 61 is operated in a clamping operation. Thus, the actuated limit switch 286 will operate to move its associated contact 286–2, in line 141, to an open position to effect deenergization of the relay 522. Simultaneously therewith, the contact 286–1 associated with the limit switch 286 is moved to closed position, and with the limit switch 287 actuated, its contact 287–1, in line 140, will be moved to a closed position, and circuit is completed along line 140 to energize the coil of the relay 488. The energized relay 488 operates to move an associated contact 488–1, in line 112, to a closed position to establish a holding circuit for maintaining the solenoid 282 energized. Simultaneously therewith, the relay 488 also operates to move its associated contact 488–2, in line 77, to an open position to thereby interrupt the holding circuit which was utilized for maintaining the coil of the relay 486 energized, and therefore, the relay 486 is now deenergized. The deenergized relay 486 operates to move its associated contacts 486–3 and 486–2, in lines 117 and 118 respectively, to their normal open and closed positions to deenergize the solenoid 407 associated with the valve 402, and energize the solenoid 403 of the valve 401. These valves are now operated so that fluid pressure is directed to the left end of the cylinder 201 of the actuator 181 for effecting the unclamping of the grip 77.

With the tool grip 77 unclamped, the limit switch 206 is actuated in a clockwise direction and its contact 206–2, in line 135, is moved to an open position to effect the deenergization of the coil of the relay 502. This will cause the relay to operate to return its associated contacts to their normal open positions, depicted in FIGS. 23, 24 and 25. The limit switch 206, upon being actuated in a clockwise direction, will also operate to move its associated contact 206–1, in line 136, to a closed position so that a circuit along line 136 is established for energizing the coil of the relay 477. With the coil of the relay 477 energized, the relay operates to move its associated contact 477–1, in line 53, to closed position. A circuit is now established for energizing the coil of the carrier left relay 480. This circuit is established from the energized line 425 along line 53, and through the closed contacts 468–3 and 477–1 to line 54 and thence to line 55, and through the now closed contacts 473–2 and 478–1 to a vertical line 532. The circuit continues along the vertical line 532 to the horizontal line 56 and through now closed contacts 498–5, 470–1 and 495–8, back to line 55 and through the coil of the relay 480 and thence to the energized line 426. The energized relay 480 operates to move its associated contact 480–2, in line 115, to an open position. As a result, a holding circuit established through the contact 480–2 is interrupted so that the energizing circuits to both the solenoid 350 associated with the valve 335 and the solenoid 356 associated with the deceleration valve 355 are interrupted and the valves 335 and 355 return to their normal positions, depicted in FIG. 22. Simultaneously, with the movement of the contact 480–2 to open position, another associated contact 480–1, in line 111, will be moved to a closed position thereby completing an energizing circuit to the solenoid 336 associated with the valve 335. The valve is now operated to direct fluid pressure to the right end of the cylinder 131 of the carrier actuator 130 thereby effecting leftward movement of the carrier away from the spindle and into the parked position, depicted in FIG. 17.

With the tool arm carrier 76 positioned in the parked position, the limit switch 234 is actuated and a circuit is completed along line 131 for energizing the coil of the relay 498. The energized relay 498 operates to move its associated contact 498–5, in line 56, to an open position thereby interrupting a circuit, previously described, to the coil of the relay 480 for deenergizing this relay. With the relay 480 deenergized, its associated contacts 480–1 and 480–2 will return to their normal positions, depicted in lines 111 and 115 respectively, thereby interrupting the circuit to the solenoid 336 associated with the valve 335 so that the valve is operated to stop the movement of the carrier 76 with the tool change arm 75 being located in the parked position.

When the carrier 76 moved leftwardly from the position depicted in FIG. 16 to the parked position depicted in FIG. 17, the limit switch 246 was released. With the limit switch 246 released to an open position shown in line 138, it operated to effect the deenergization of the coil of the relay 510 which, in turn, operates to interrupt the holding circuit to the coil of the tool transfer command relay 511. Thus, the relay 511 is deenergized and operates to move its associated contact 511–4, in line 27, to a closed position. It will be recalled that when the tool carrier 76 was positioned in the parked position, the relay 480 was deenergized and its associated contact 480–3, in line 67, was returned to its normally closed position to complete a circuit along line 67 for energizing the coil of the relay 496. The energized relay 496 operated to move its associated contact 496–3, in line 50, to a closed position to complete a circuit along line 50 to the vertical line 512 and thence to the coil of the relay 514 for energizing this relay. The relay 514, upon being energized, moves its associated contact 514–1, in line 27, to a closed position and thus, when the contact 511–4 of the tool transfer command relay 511 is returned to its normal closed position upon the deenergization of the coil of the relay, a circuit is completed for energizing the tape reader 451 so that signals from the tape may be obtained for effecting the operation of the spindle and the various movable components in a machining operation.

With the tool change arm 75 in the parked position and in 180° position wherein the grip 78 is in a leftwardly extending position, depicted in FIG. 17, carrying the tool 60B for insertion into the magazine 71, the tool change arm 75 must be actuated to extended or "out" position so that the shank of the tool 60B will clear the magazine 71 upon further leftward movement of the arm 75. In order to accomplish the extension of the tool change arm 75, the tool arm "out" relay 499 must be energized. A circuit for energizing the coil of the relay 499 is established by the movement of a normally open contact 496–4, in line 102, to a closed position which was accomplished at the time that the carrier 76 moved into the parked position wherein the relay 496 was energized. With the contact 496–4 in closed position, a circuit for energizing the coil of the relay 499 is established from the energized line 425 along line 106, a vertical line 533 to line 104 and thence through the now closed contact 470–2 to a connected vertical line 534 and thence to line 102 and through the now closed contact 496–4 to line 101, and by means of the common vertical line 503 to line 100 and thence to the coil of the relay 499. With the coil of the relay 499 energized, the relay operates to move its associated contacts 499–3 and 499–4, in lines 126 and 127, to open and closed positions respectively. With the contact 499–3 in line 126 moved to open position, the holding circuit for maintaining the solenoid 363 energized is interrupted so that the solenoid is deenergized. Therefore, the valve 361 is operated to connect the lower end of the cylinder 146 to the exhaust line 265. Simultaneously therewith, the now closed contact 499–4, in line 127, will complete the circuit along line 127 for energizing the solenoid 368 associated with the valve 362 and it is operated to direct fluid pressure to the upper end of the cylinder 146. With the actuator 145 receiving fluid pressure as described, the actuator operates to effect the outward movement of the tool change arm 75 and the arm is moved from the position shown in FIG. 17, to the position shown in FIG. 18, wherein it is in full extended or out position.

With the tool change arm 75 in full extended position, it may be moved into a full leftward position wherein the tool 60B, carried by the grip 78, will be located in axial alignment with a storage socket presented by the magazine 71. The leftward movement of the tool change arm 75 is initiated by the actuation of the limit switch 251 in a clockwise direction, as viewed in FIG. 22, and which is accomplished when the tool change arm 75 is moved to its fully extended position. Upon being actuated in a clockwise direction, the limit switch 251 will operate to move its associated contact 251–2, in line 132, to a closed position. This will establish a circuit along line 132 for energizing the coil of the relay 506. With the relay 506 energized, it immediately operates to move its associated contact 506–3, in line 57, to a closed position to complete a circuit to effect the energization of the coil of the tool carriage left relay 480. This energizing circuit is completed from the energized line 425 along line 53 through the now closed contacts 468–3 and 47–1 to line 54 and thence to line 55. The energizing circuit continues along line 55 and through the now closed contact 473–2 to a vertical line 536 and thence along line 57 through the now closed contact 506–3 and through a vertical connected line 537 to line 56. The energizing circuit continues along line 56 and through the now closed contacts 470–1 and 495–8 to line 55 and thence through the coil of the relay 480 and along line 55 to the energized line 426. The energized relay 480 operates to move its associated contact 480–3, in line 67, to an open position for effecting the deenergization of the carrier park relay 496. Simultaneously therewith, the relay 480 operates to move its associated contacts 480–1 and 480–2, in lines 111 and 115, to closed and open positions respectively. With the contact 480–1 moved to closed position, it will operate to establish a circuit along line 111 for energizing the solenoid 336 associated with the valve 335 to effect the operation of the valve for directing fluid pressure to the right end of the cylinder 131 of the carrier actuator 130. Thus, the carrier 76 will move leftwardly, moving the tool arm 75 from the parked position, shown in FIG. 18, into the position shown in FIG. 19. As the carrier 76 leaves the parked position, the limit switch 234, in line 131, will be deactuated and will open thereby effecting the deenergization of the coil of the relay 498. The contacts associated with the relay 498 are thereupon returned to their normal positions.

It will be recalled that whenever the carrier 76 is moved into its full leftward position, the limit switch 226 is actuated. Thus, at this time, the switch is actuated to a closed position and operates to complete the circuit for energizing the coil of the relay 481. As a result, a normally open time-to-close contact 480–2, in line 66, is moved to a closed position after a predetermined time that insures that the tool arm 75 is in full leftward position. When the contact 480–2, in line 66, is moved into a closed position, it will operate to complete a circuit for energizing the coil of the relay 483. The energized relay 483 operates to move its associated contact 483–4, shown in line 91, to a closed position. Thus, a circuit from the energized line 425 is completed along line 92 to line 91 and through the now closed contact 483–4 to a vertical line 538 and thence to line 93 with the circuit continuing leftwardly along line 93 to line 94 and thence through the now closed contact 495–6 to the coil of the relay 493 for energizing the relay. The energized relay 493 operates to move its associated contact 493–2, in line 98, to an open position thereby interrupting the circuit along line 98 to effect the deenergization of the relay 499. The energized relay 493 also operates to move its associated contact 493–4, in line 128, to an open position to interrupt a maintaining circuit which kept the solenoid 368 associated with the valve 362 energized so that the solenoid is now deenergized. Simultaneously, a contact 493–3, in line 125, is moved to a closed position thereby completing the circuit along line 125 for energizing the solenoid 363 associated with the valve 361. The valves 362 and 361 are thereupon operated so that fluid is admitted to the lower end of the cylinder 146 for effecting the operation of the actuator 145 in a direction to effect retraction or inward movement of the tool change arm 75 inserting the tool 60B into the socket of the magazine 71, as depicted in FIG. 21.

The replacement of the previously used tool 60B into stored position in the magazine 71 by the inward or retracting movement of the tool change arm 75 will cause the limit switch 251 to be actuated in a counterclockwise direction. The counterclockwise actuation of the limit switch 251 will operate to effect the movement of the contact 251–2, in line 132, to an open position to deenergize the relay 506. The deenergized relay 506 operates to move its associated contacts to their normal positions, as depicted in FIGS. 24 and 25. The counterclockwise actuation of the limit switch 251 also operates to move its associated contact 251–1, in line 129, to a closed position thereby completing a circuit along line 129 for energizing the coil of the relay 478. The energized relay 478 will operate to effect the movement of the associated normally closed time-to-open contact 478–6, in line 79, to an open position. When the time-to-open contact 478–6 moves to an open position, it will effect the deenergization of the coil of the relay 487, in line 81. The energized relay 487 also operates to move its associated contact 487–3, in line 119, to an open position thereby effecting the deenergization of a solenoid 415 associated with the valve 411. The valve 411 is now operable to connect the right end of the cylinder 196 of the grip actuator 182 to the return line 265. Simultaneously therewith, the energized relay 487 also operates to move its normally open contact 487–2, in line 120, to a closed position to complete a circuit for energizing the solenoid 412 associated with the valve 410. The valve 410 now operates to direct fluid pressure to the left end of the cylinder 196 for effecting the operation of the actuator 182 for unclamping the grip 78. With the tool grip 78 unclamped, the limit switch 207 is operated to effect the movement of an associated contact 207–1, in line 133, to an open position thereby effecting the deenergization of the relay 470. With the relay 470 deenergized, it is now conditioned in an initial condition for a subsequent tool change cycle of operation.

The operation of the limit switch 207 also moved its associated contact 207–2, in line 134, to a closed position to effect the energization of the relay 469. As a result, the energized relay 469 operates to move its associated contact 469-4, in line 58, to a closed position. A circuit is established along line 58 through the now closed contact 469-4 to the vertical line 507, and thence to lines 60 and 61. The circuit continues along line 61 and through the now closed contact 498-2 to a vertical line 539 and thence to line 64 and along line 64 through the now closed contact 495-3 to line 65 and thence to the coil of the tool carrier right relay 482 for energizing the relay. The energized relay 482 operates to move its associated contact 482-2, in line 66, to an open position thereby interrupting the circuit to the coil of the relay 483 to deenergize the coil. With the relay 483 deenergized, its associated contacts are all moved to their normal positions, as depicted in FIGS. 24 and 25. The energized relay 482 also operates to move its normally closed contact 482-1, in line 112, to an open position to deenergize the solenoid 336 associated with the valve 335. Thereupon, the valve is operated to its normal position depicted in FIG. 22.

The energized relay 482 also operates to move its normally open contact 482-3, in line 114, to a closed position. Since the carrier 76 is presently in full leftward position, the deceleration limit switch 238 will be deactuated, and therefore, its contact 238-1 will be in engagement with the terminal 517, depicted in line 114. Therefore, with the contact 482-3 in closed position, an energizing circuit is established along line 114 and through the contact 238-1 to the terminal 517. The circuit continues from the terminal 517 along the vertical line 508 to line 109 and thence to the solenoid 350 for energizing this solenoid. The energized solenoid 350 operates the valve 335 so that fluid pressure is directed to the left end of the cylinder 131 of the carrier actuator 130. With the actuator 130 energized as described, the carrier 76 will be moved rightwardly so that the tool arm 75 is moved out of the position shown in FIG. 20, to disengage the grip 78 from the tool 60B and is moved into the parked position depicted in FIG. 21.

With the carrier 76 positioned in the parked position, the limit switch 234 will be actuated to a closed position thereby completing a circuit along line 131 for energizing the coil of the relay 498. With the relay 498 energized it will operate to move its associated contact 498-2, in line 61, to an open position which serves to deenergize the tool carriage right relay 482. The relay 482, upon being deenergized, operates to move its associated contact 482-4, in line 67, to a closed position. This will now complete a circuit along the line 67, because at this time the normally open contact 498-3, associated with presently energized relay 498, is in closed position, and the contact 480-3 is also in closed position because its associated relay 480, which is the tool carriage left relay, is deenergized. As a result, the relay 496 is energized and operates to effect the movement of its associated contact 496-5, in line 84, to a closed position. At this time, the tool grip clamp relay 470 is deenergized so that an associated contact 470-7, in line 84, is in its normal closed position. Thus, with the contact 496-5 in closed position, a circuit is completed along line 84 to energize the coil of the tool arm clockwise rotation relay 528. With the relay 528 energized, the relay will operate to move its associated contact 528-1, in line 86, to a closed position. This action completes a holding circuit for maintaining the coil of the relay 528 energized. The holding circuit is completed along line 86 through the normally closed contact 527-1 of the presently deenergized relay 527, through the now closed contact 528-1 of the relay 528, and through the normally closed contact 520-5 of the collet unclamped relay 520. The holding circuit continues along lines 85 and 84 and thence to the coil of the relay 528.

The energized relay 528 also operates to move its associated contact 528-4 in line 121, and contact 528-5, in line 124, to closed and open positions respectively.

With the contact 528-5 in open position, the solenoid 378 associated with the valve 376 is deenergized and the valve operates to connect the upper end of the cylinder 161 of the arm rotation actuator 160 to the return line 265, depicted in FIG. 22. On the other hand, the contact 528-4 upon being moved to its closed position, operates to complete a circuit for energizing the solenoid 377 associated with the valve 375. With the solenoid 377 energized, the valve 375 is operated to direct fluid pressure to the lower end of the cylinder 161 thereby energizing the actuator 160 for rotating the tool arm 75 from the 180° position depicted in FIG. 21, to its 0° or initial position depicted in FIG. 7. Thus, the tool change arm 75 is now in its initial position wherein it is in the parked position, and its associated tool grips 77 and 78 are in unclamped positions with the grip 77 extending leftwardly toward the magazine 71 while the grip 78 extends rightwardly toward the spindle 55. With the tool change arm 75 in its initial condition, the electrical control system is now conditioned for another tool selection operation and tool changing function.

From the foregoing detailed description of the illustrative embodiment set forth herein to exemplify the present invention, it will be apparent that there has been provided an improved machine tool incorporating a mechanical tool changer, as well as a tool storage magazine which carries a supply of tools in a minimum of space with the tool changer operating between the magazine and spindle regardless of the lateral position of the spindle with respect to the magazine, and the tool changer is operable to replace a tool in the spindle with a new tool from the storage magazine in a minimum period of time. The tool selected for the succeeding operation is moved to the tool ready station in the magazine, while the preceding machining operation is being performed, and the tool change mechanism is automatically operated to secure and remove the selected tool for the preceding operation and to hold this tool in readiness so that it may be interchanged with the tool presently being used. The tool change mechanism, in holding the new tool in readiness, is located so that it does not interfere with the operation of the spindle in performing a work operation; nor does it interfere with the rotation of the magazine 70 as it operates to move the tools carried thereby past the reading head.

Although the illustrative embodiment of the invention has been described in considerable detail for the purpose of disclosing a practical operative structure whereby the invention may be practiced advantageously, it is to be understand that the particular apparatus described is intended to be illustrative only and that the novel characteristics of the invention may be incorporated in other structural forms without departing from the spirit and scope of the invention.

This invention having now been fully explained in connection with the foregoing description, we hereby claim as our invention:

1. In a machine tool;
  a frame;
  a tool operator movably supported by said frame;
  tool storage means adapted to carry a plurality of tools for use in said tool operator;
  a tool transfer member actuatable to transfer tools between said tool storage means and said tool operator; and,
  extensible guide means slidably carrying said tool transfer member for movement between said storage means and said tool operator, said guide means adjusting with the relative movement of said storage means and said tool operator to maintain communication therebetween despite the variable spacing of said tool operator from said tool storage means.

2. In a machine tool;
  a frame;

tool holding means supported by said frame in position to carry a tool for operation on a workpiece;

tool storage means carrying a plurality of tools for placement in said tool holding means, said tool storage means and said tool holding means being movable relative to each other;

tool change means operable to extract a new tool from said storage means and transfer it to said tool holding means and to return the old tool from said tool holding means to said storage means; and, guide means movably carrying said tool storage means for travel between said storage means and said tool holding means, said guide means adjusting in response to the relative movement of said tool storage means and said tool holding means to accommodate for the different spacing therebetween to maintain a guiding connection for the movement of said tool change means between said tool storage means and said tool holding means.

3. In a machine tool;

a frame;

a tool operator movably supported by said frame;

tool storage means adapted to carry a plurality of tools for use in said tool operator;

a tool transfer member actuatable to transfer tools between said tool storage means and said tool operator; and, extensible guide means adapted to slidably carry said tool transfer means for movement between said storage means and said tool operator, said guide means being connected to move with said tool operator for adjusting the guide path between said tool storage means and said tool operator to accommodate for the variations in spacing between said tool operator and said storage means.

4. In a machine tool;

a power driven spindle provided with a tool receiving socket;

a magazine provided with a plurality of storage sockets each adapted to receive a tool which is useable in said spindle, said magazine and said spindle being movable relative to each other;

a tool change arm operable to transfer a selected tool from said magazine to said spindle; and, a movable guideway adjustable axially to extend between said tool storage magazine and said spindle and operable to support said tool change arm for movement in a tool transfer operation.

5. In a machine tool having a power driven spindle provided with a tool receiving socket;

a tool storage magazine provided with a plurality of sockets for receiving and storing a plurality of tools, each adapted to be operatively engaged in said tool receiving socket of said spindle;

a tool change member operably connected to withdraw a desired tool from said magazine and transferring it to said spindle;

extensible guide means for supporting said tool change member for bodily movement between said magazine and said spindle; and, gripping means on said tool change member operable to grip a tool for transfer between said magazine and said spindle.

6. In a machine tool having a power driven spindle provided with a tool receiving socket;

a tool storage magazine rotatably supported adjacent the machine and having a plurality of tool receiving storage sockets;

a tool change arm supported for movement between said magazine and said spindle for removing the selected tool from said magazine and transferring it to said spindle;

a supporting guideway extendible between said magazine and machine spindle for supporting said tool change arm for movement therebetween; and, a gripping member on said tool change arm for engagement with a selected tool and operative to clamp the latter for transfer to said spindle.

7. In a machine tool;

a power driven spindle provided with a tool receiving socket;

a tool storage magazine removably holding a plurality of tools which are to be used in said spindle, said magazine and said spindle being movable relative to each other;

a tool change arm operable to withdraw a selected tool from its storage position in said magazine and to transfer the tool to said spindle and to withdraw a tool from said spindle and transfer it to a storage position in said magazine;

a guideway extending between said magazine and said spindle for supporting said tool change arm in a tool transfer movement, said guideway being adjustable upon relative movement between said magazine and said spindle to span the space therebetween;

means for moving said magazine and said guideway relative to each other to position a socket containing the selected tool adjacent said guideway; and, a pair of grips carried by said tool change arm for engagement with the selected tool in said magazine and a tool in said spindle and selectively operable to secure the tools to said tool change arm for transfer.

8. In a machine tool;

a base;

a column movably supported on said base;

a spindle head having rotatable tool receiving spindle supported on said column for movement in a direction transverse to the direction in which the column is movable;

a tool storage magazine adapted to removably hold a plurality of tools that are to be used in said spindle;

a horizontally disposed guideway supported for horizontal axial movement and connected to move with said column in either direction; and, a tool change member supported on said guideway for movement between said magazine and said spindle and operable to remove a tool from said magazine and transfer and insert the tool in said spindle and to remove a previously used tool from said spindle and transfer and insert the previously used tool into said magazine for storage.

9. In a machine having a tool change station;

a tool receiving spindle carried for horizontal and vertical movement;

a tool carrying storage magazine having a tool ready station in which a tool selected for transfer to said spindle is located;

a guideway carried for horizontal axial movement at a fixed vertical position that is in alignment with the tool change station so that said guideway extends between the tool ready station of said magazine and the tool change station irrespective of the position of said tool receiving spindle; and, a tool change member supported on said guideway for horizontal movement for transferring a desired tool from the tool ready station to said spindle and transferring a previously used tool from said spindle to said ready station for storage in said magazine.

10. In a machine tool;

a frame;

an operating member supported by said frame and adapted to receive tools, said operating member being supported for horizontal lateral movement;

a tool storage magazine rotatably supported adjacent the machine tool and having a tool ready station;

a plurality of different tools stored in said magazine and adapted to be used in the operating member of the machine;

means operably connected to rotate said magazine for locating a selected tool at the ready station;

a guideway supported for lengthwise movement in a direction parallel to the direction in which said operating member is movable, said guideway moving in response to the horizontal lateral movement of said operating member; and, a tool change member movably supported on said guideway for independent movement thereon between said magazine and said operating member irrespective of the lateral position of said operating member relative to said magazine, said tool change member being operable to transfer a selected tool located at the ready station from said magazine to said spindle and transfer a previously used tool from said spindle to said magazine.

11. In a machine tool;

a frame;

a tool operator adapted to receive different tools for performing various work operations, said operator being supported by said frame for movement in two mutually transverse paths of travel for performing work operations and in one of the paths of travel for location at a tool change position;

a tool storage magazine having a plurality of tools stored therein for selective placement at a ready station for transfer to said operator;

a guideway carried by said frame at a predetermined level which includes the tool change position, said guideway being operably connected to be moved axially by said operator so as to provide a continuous guide path between the tool ready station and the tool change position irrespective of the lateral position of said operator relative to said tool storage magazine; and, a tool change member supported for movement on said guideway for transferring tools between said magazine and said operator, said tool change member also being axially and rotatably movable for withdrawing and inserting tools in said magazine or said operator selectively and for interchanging the positions of the tools so that a selected tool transfer to the operator is positioned in axial alignment with the operator for insertion therein and the previously used tool removed from the operator is moved out of axial alignment with the operator.

12. In a machine tool;

a frame;

a tool operator carried by said frame for movement along X and Y axes for performing different machining operations and for movement along the Y axis to a tool change position;

a tool storage magazine rotatably supported by said frame and adapted to removably carry a plurality of tools, said tool storage magazine having a tool ready station at which a selected tool is located for transfer to said operator;

a plurality of tools stored in said magazine for use in said operator;

a guideway supported by said frame at a predetermined fixed position along the Y axis which includes the tool ready station and the tool change position and for variable positioning movement along the X axis in response to the movement of said operator along the X axis thereby being operably disposed to provide a supporting guideway between said tool ready station and said tool change position irrespective of the position of said operator along the X axis; and, a tool change member carried on said guideway for movement therealong between said tool ready station and said tool change position for transferring a selected tool from said magazine to said operator and transferring the previously used tool from said operator to a storage position in said magazine.

No references cited.

RICHARD H. EANES, JR., *Primary Examiner.*